(12) United States Patent  
Hirata

(10) Patent No.: US 8,711,473 B2  
(45) Date of Patent: Apr. 29, 2014

(54) FOCUS ADJUSTMENT UNIT AND OPTICAL SCANNING MICROSCOPE

(75) Inventor: Tadashi Hirata, Hachioji (JP)

(73) Assignee: Olympus Corporation, Tokyo (JP)

( * ) Notice: Subject to any disclaimer, the term of this patent is extended or adjusted under 35 U.S.C. 154(b) by 881 days.

(21) Appl. No.: 12/206,961

(22) Filed: Sep. 9, 2008

(65) Prior Publication Data

US 2009/0073553 A1 Mar. 19, 2009

(30) Foreign Application Priority Data

Sep. 14, 2007 (JP) .................................. 2007-240103  
Sep. 14, 2007 (JP) .................................. 2007-240104

(51) Int. Cl.
*G02B 21/00* (2006.01)
*G02B 21/24* (2006.01)

(52) U.S. Cl.
CPC ................................... *G02B 21/241* (2013.01)
USPC ......................................................... 359/379

(58) Field of Classification Search
None
See application file for complete search history.

(56) References Cited

U.S. PATENT DOCUMENTS

| 2005/0046935 A1 | 3/2005 | Tanaami | |
| 2006/0098213 A1* | 5/2006 | Itoh et al. | 356/632 |
| 2006/0103922 A1 | 5/2006 | Tsuyuki | |

FOREIGN PATENT DOCUMENTS

| JP | 06034880 | 2/1994 |
| JP | 2003-077167 | 3/2003 |
| JP | 2005070477 | 3/2005 |
| JP | 2005-121796 | 5/2005 |
| JP | 2005-327402 | 11/2005 |
| JP | 2006079000 | 3/2006 |
| JP | 2006139181 | 6/2006 |

OTHER PUBLICATIONS

English machine translaction of Japanese Publication No. JP 2006-079000 A.*  
English Machine Translation of Japanese Publication No. 2005-327402A. Published Nov. 24, 2005.*  
English Machine Translation of Japanese Publication No. 2003-077167A. Published Mar. 14, 2003.*  
Japanese Office Action dated Aug. 21, 2012.

* cited by examiner

*Primary Examiner* — Derek S Chapel  
(74) *Attorney, Agent, or Firm* — Pillsbury Winthrop Shaw Pittman, LLP

(57) ABSTRACT

An optical scanning microscope is presented in which the observation magnification does not significantly change even when the working distance of an objective lens is changed. The optical scanning microscope includes an objective optical system that converts the light from a specimen into a substantially collimated light beam, an imaging optical system that forms an image from the collimated light beam, a pupil projection optical system that substantially collimates the light formed into an image, a lateral scanner that angularly deflects the collimated light beam from the pupil projection optical system to laterally scan the area of the specimen to be observed, and a lens driver that drives the imaging optical system and/or the pupil projection optical system along the optical axis direction. The imaging optical system is disposed such that its front focal point is positioned proximate to the back focal point of the objective optical system.

19 Claims, 24 Drawing Sheets

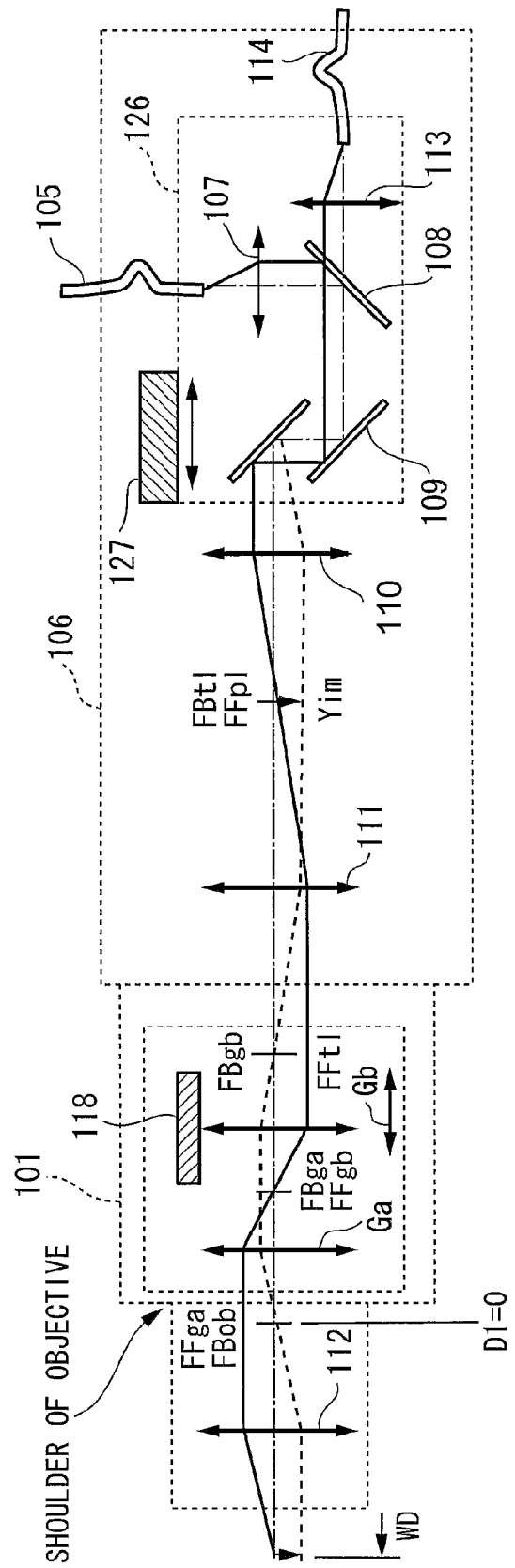

FOCUS ADJUSTMENT UNIT AND OPTICAL SCANNING MICROSCOPE

BACKGROUND OF THE INVENTION

1. Field of the Invention

The present invention relates to a focus adjustment unit and an optical scanning microscope.

This application is based on Japanese Patent Applications Nos. 2007-240103 and 2007-240104, the contents of which are incorporated herein by reference.

2. Description of Related Art

There has been a microscope in which a positive refractive power optical element and a negative refractive power optical element are disposed between a light source and an objective lens and the physical distance between these optical elements is changed to change the working distance of the objective lens (see Japanese Unexamined Patent Application, Publication No. 2005-70477, for example).

Also disclosed is a microscope in which an adaptor lens is detachably attached to a finite distance objective lens (see Japanese Unexamined Patent Application, Publication No. 2006-79000, for example). In the microscope, a small-diameter, finite distance objective lens is combined with an adaptor lens, and the working distance of the objective lens is changed by moving the adaptor lens in the optical axis direction.

There has also been a microscope having a detachable, finite distance objective lens (see Japanese Unexamined Patent Application, Publication No. 2006-139181, for example). In the microscope, a finite distance objective lens is combined with an imaging lens, and the working distance of the objective lens is changed by moving the imaging lens in the optical axis direction.

The patent publication disclosures about the above microscopes, however, do not describe at all the positional relationship of the objective lens and the imaging lens with the optical system that shifts the focal point, and it is conceivable that moving a lens that is part of the optical system in the optical axis direction in order to change the working distance of the objective lens may disadvantageously change the observation magnification greatly if no consideration is given to the positional relationship of the optical system with the objective lens and the imaging lens.

BRIEF SUMMARY OF THE INVENTION

The invention has been made in view of the above circumstances. An object of the invention is to provide a focus adjustment unit and an optical scanning microscope that does not greatly change the observation magnification even when the working distance of the objective lens is changed.

A first configuration of the invention is an optical scanning microscope including an objective optical system that converts the light from a specimen into a substantially collimated light beam, an imaging optical system that forms an image from the substantially collimated light beam from the objective optical system at a predetermined position, a pupil projection optical system that substantially collimates the light formed into an image by the imaging optical system at the predetermined position, a lateral scanner that angularly deflects the substantially collimated light beam from the pupil projection optical system to laterally scan the location of the specimen to be observed, and a lens driver that drives the imaging optical system or the pupil projection optical system or both in the optical axis direction. Defining the front side as the side where the specimen is located, the imaging optical system is disposed in such a way that the front focal point thereof is positioned in the vicinity of the back focal point of the objective optical system.

According to the first configuration of the invention, driving the imaging optical system or the pupil projection optical system or both in the optical axis direction changes the working distance of the objective lens. In this case, disposing the front focal point of the imaging optical system in the vicinity of the back focal point of the objective optical system can reduce the change in magnification when the imaging optical system or the pupil projection optical system is moved in the optical axis direction.

It is noted that here a substantially collimated light beam not only includes an exactly collimated light beam but also a slightly divergent or convergent light beam.

In the first configuration described above, it is preferable that the lens driver drives the imaging optical system in the optical axis direction, the pupil projection optical system is fixed, and the following equation (1) is satisfied:

$$|D1a \times \Delta s|/(Ftl)^2 \leq 0.05 \qquad (1)$$

where $\Delta s$ represents the total distance over which the imaging optical system moves; $D1a$ represents the gap between the back focal point of the objective optical system and the front focal point of the imaging optical system when the imaging optical system moves to a middle position; and $Ftl$ represents the focal length of the imaging optical system.

Such a configuration can reduce the change in magnification when the working distance is changed.

In the first configuration described above, it is preferable that $D1a=0$.

Such a configuration can completely prevent change in magnification when the working distance is changed.

In the first configuration described above, the lens driver may alternatively drive the pupil projection optical system in the optical axis direction, whereas the imaging optical system may be fixed. In this case, the following equation (2) may be satisfied:

$$|D1 \times \delta s|/(Ftl)^2 \leq 0.05 \qquad (2)$$

where $\delta s$ represents the total distance over which the pupil projection optical system moves; $D1$ represents the gap between the back focal point of the objective optical system and the front focal point of the imaging optical system, and $Ftl$ represents the focal length of the imaging optical system.

In the first configuration described above, it is preferable that $D1=0$.

Such a configuration can completely prevent change in magnification when the working distance is changed.

In the first configuration described above, the pupil projection optical system or the imaging optical system or both may be moved within a range centered at a position where it becomes an afocal optical system.

Such a configuration can reduce the change in magnification when the working distance is changed.

In the first configuration described above, the lateral scanner may be disposed in the vicinity of the back focal point of the pupil projection optical system.

If this is done, a nearly telecentric optical system (the exit pupil is located at infinity) can be formed on the side toward the specimen.

In the first configuration described above, the optical scanning microscope may further include a light emitter that emits light that illuminates or excites the specimen, a light receiver that receives the light from the specimen, a first collimator optical system that substantially collimates the light from the light emitter, a second collimator optical system that focuses the light from the specimen on the light receiver, a detected light separator that separates the light from the specimen from the light from the light emitter, a scan optical system that includes the lateral scanner, and a pupil position adjuster that moves the scan optical system in the optical axis direction of the pupil projection optical system so that the pupil position coincides with a point in the vicinity of the lateral scanner.

A second configuration of the invention is a focus adjustment unit used in a microscope system including an objective optical system that converts the light from a specimen into a substantially collimated light beam and an imaging optical system that forms an image from the substantially collimated light beam from the objective optical system at a predetermined position, the focus adjustment unit disposed between the objective optical system and the imaging optical system and changing the working distance of the objective optical system. Defining the front side to be the side where the objective optical system is located and the back side to be side where the imaging optical system is located, the focus adjustment unit includes a front-group optical system and a rear-group optical system disposed in this order from the front side, each of the optical systems having a refractive power, and a lens driver that drives the front-group optical system or the rear-group optical system or both in the optical axis direction to change the relative distance between the two optical systems in the optical axis direction. The front-group optical system is disposed in such a way that the front focal point thereof is positioned in the vicinity of the back focal point of the objective optical system.

According to the second configuration of the invention, driving the front-group optical system or the rear-group optical system or both in the optical axis direction changes the working distance of the objective lens. In this case, disposing the front focal point of the front-group optical system in the vicinity of the back focal point of the objective optical system can reduce the change in magnification when the front-group optical system or the rear-group optical system is moved in the optical axis direction.

It is noted, as in the first configuration, that here a substantially collimated light beam not only includes an exact collimated light beam but also a slightly divergent or convergent light beam.

In the second configuration described above, the front-group optical system and the rear-group optical system may be moved within a range centered at a position where the front-group optical system and the rear-group optical system form an afocal optical system. Such a configuration can reduce the change in magnification when the working distance of the objective lens is changed.

The second configuration described above may be such that only the front-group optical system can be moved in the optical axis direction, the rear-group optical system is fixed, and the following equation (8) is satisfied:

$$|D1a \times \Delta s|/(Fla)^2 \leq 0.05 \quad (8)$$

where $\Delta s$ represents the total distance over which the front-group optical system moves; $D1a$ represents the gap between the back focal point of the objective optical system and the front focal point of the front-group optical system when the front-group optical system moves to the middle position of its movement range; and Fla represents the focal length of the front-group optical system.

In the second configuration described above, $D1a$ may be zero.

Such a configuration can greatly reduce the change in magnification when the working distance is changed.

The second configuration described above also may be such that the front-group optical system is fixed, only the rear-group optical system can be moved in the optical axis direction, and the following equation (9) is satisfied:

$$|D1 \times \delta s|/(Fla)^2 \leq 0.05 \quad (9)$$

In the equation (9), $\delta s$ represents the total distance over which the rear-group optical system moves; D1 represents the gap between the back focal point of the imaging optical system and the front focal point of the front-group optical system; and Fla represents the focal length of the front-group optical system.

In the second configuration described above, it is preferable that the front focal point of the front-group optical system coincides with the back focal point of the objective optical system.

Such a configuration can completely prevent the change in magnification when the working distance is changed.

In the second configuration described above, it is preferable that $|Fla|>|Flb|$.

In such a configuration, the pupil diameter of the objective optical system can be reduced, and the outer dimension of the objective optical system can be reduced accordingly.

In the second configuration described above, the front-group optical system may have a negative focal length.

In such a configuration, the total length of the focus adjustment unit can be reduced.

In the second configuration described above, the back focal point of the objective optical system may be located behind the abutting position of the objective optical system.

In such a configuration, the gap between the front focal point of the front-group optical system and the back focal point of the objective optical system can be reduced, whereby the change in magnification when the working distance is changed can be reduced.

In the second configuration described above, the focus adjustment unit may further include an adjustment mechanism that adjusts the gap between the back focal point of the objective optical system and the front focal point of the front-group optical system.

In such a configuration, the adjustment mechanism can make adjustment in such a way that the change in magnification is very small and nearly linear even when the position of the back focal point of the objective optical system differs from the abutting position of the objective optical system.

In the second configuration described above, the back focal point of the rear-group optical system may be located in the vicinity of the front focal point of the imaging optical system.

In the second configuration described above, the focus adjustment unit may further include an adjustment mechanism that adjusts the gap between the back focal point of the rear-group optical system and the front focal point of the imaging optical system.

In such a configuration, a nearly telecentric optical system (the exit pupil is located at infinity) can be formed at the image plane.

A third configuration of the invention is an optical scanning microscope including an objective optical system that focuses the light from a specimen, an imaging optical system that forms an image from the light focused by the objective optical system at a predetermined position, any focus adjustment unit according to the second configuration, a pupil projection optical system which is disposed behind the imaging lens and which converts the image of the specimen formed by the imaging lens at the predetermined position into a collimated light beam, a scan optical system including a lateral scanner that laterally scans the light substantially collimated by the pupil projection optical system, a light emitter that emits light that illuminates or excites the specimen, a light receiver that receives the light from the specimen, a first collimator optical system that substantially collimates the light from the light emitter, a second collimator optical system that focuses the light from the specimen at the light receiver, a detected light separator that separates the light from the specimen from the light from the light emitter, and a pupil position adjuster that moves the scan optical system in the optical axis direction of the pupil projection optical system so that the pupil position coincides with a point in the vicinity of the lateral scanner.

According to the invention, the working distance of the objective lens can be changed without changing the observation magnification by much.

BRIEF DESCRIPTION OF THE SEVERAL VIEWS OF THE DRAWINGS

FIG. 31 shows a microscope body of a modification of the laser scanning microscope shown in FIG. 14, the modification of the laser scanning microscope including a scan optical system movable in the optical axis direction.

Figure 1:
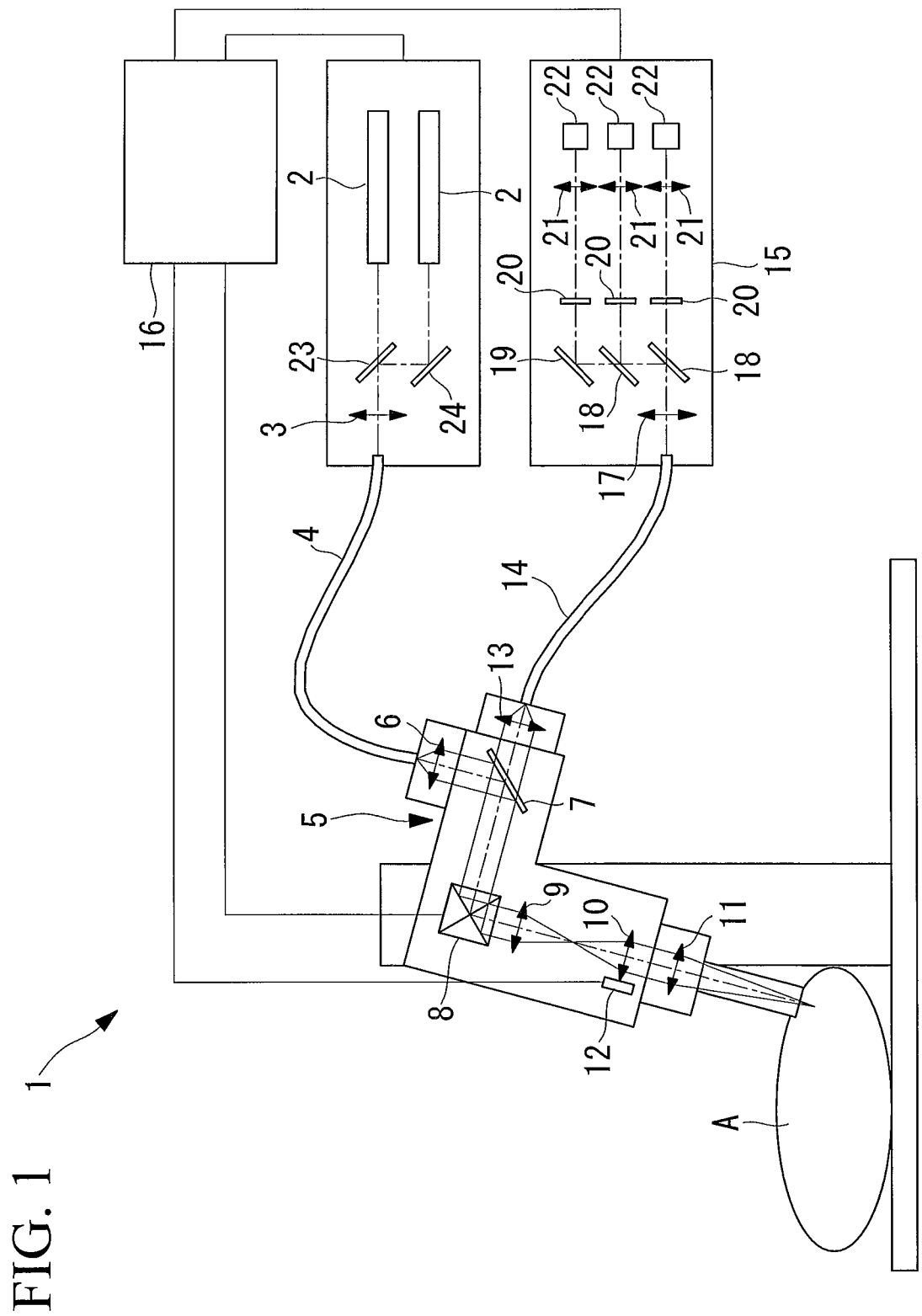
FIG. 1 is an overall configuration diagram showing a laser scanning microscope according to a first embodiment of the invention.

A: Specimen
1, 30, 40: Laser scanning microscope (optical scanning microscope)
4a: Radiation exit end (light output portion)
6: Collimator optical system (first collimator optical system)
7: Dichroic mirror (detected light separator)
8: Closely set galvanometric mirrors (lateral scanners)
9: Pupil projection optical system
10: Imaging optical system 11: Objective optical system
12, 12': Lens driver
13: Coupling optical system (second collimator optical system)
14a: Radiation entrance end (light receiver portion)
41: Scan optical system
42: Pupil position adjuster
Ga: Front-group optical system
Gb: Rear-group optical system
101: Focus adjustment unit
102: Laser scanning microscope (microscope system)
105: Optical fiber (light exit)
106: Collimator optical system (first collimator optical system)
108: Dichroic mirror (detected light separator)
109: Adjacent galvanometric mirrors (lateral scanners)
110: Pupil projection optical system
111: Imaging optical system
112: Objective optical system
113: Coupling optical system (second collimator optical system)
114: Optical fiber (light receiver)
118: Lens driver
126: Scan optical system
127: Pupil position adjuster

DETAILED DESCRIPTION OF THE INVENTION

A laser scanning microscope (optical scanning microscope) 1 according to a first embodiment of the invention will be described below with reference to FIGS. 1 to 6.

The laser scanning microscope 1 according to the present embodiment includes a laser light source 2 that emits laser light, a coupling optical system 3 that focuses the laser light from the laser light source 2, an optical fiber 4 that guides the laser light focused by the coupling optical system 3, a microscope body 5 that is connected to the laser light source via the optical fiber 4, a optical detection system 15, a controller 16 that controls the above components, and a display device (not shown) that displays a fluorescent light or reflected light image detected by the optical detection system 15.

The microscope body 5 includes a collimator optical system 6 that converts the laser light that has exited from the optical fiber 4 into a substantially collimated light beam, a dichroic mirror 7 that deflects the laser light substantially collimated by the collimator optical system 6, adjacent galvanometric mirrors 8 that scan the laser light deflected off the dichroic mirror 7 in two dimensions, a pupil projection optical system 9 that focuses the laser light scanned by the adjacent galvanometric mirrors 8, an imaging optical system 10 and an objective optical system 11 that focus the focused light on a specimen A, and a lens driver 12 that drives the imaging optical system 10 in the optical axis direction.

The microscope body 5 includes the dichroic mirror 7 that transmits fluorescent light or reflected light that has returned from the specimen A via the objective optical system 11, the imaging optical system 10, the pupil projection optical system 9, and the adjacent galvanometric mirrors 8, and further includes a coupling optical system 13 that focuses the transmitted light onto an optical fiber 14, and an optical fiber 14 that guides the fluorescent light or reflected light that has returned from the specimen A and has been focused by the coupling optical system 13.

The microscope body 5 is not only disposed so as to be movable in three mutually orthogonal axial (XYZ) directions and also rotatable around these axes so that the position and the angle of the tip of the objective optical system 11 can be arbitrarily adjusted.

The adjacent galvanometric mirrors 8 are designed to scan an area to be observed in directions substantially perpendicular to the optical axis of the objective optical system 11. The intensity distribution of the light from the portion of the specimen A that corresponds to the present deflection angle of the adjacent galvanometric mirrors 8 is displayed on the display.

The objective optical system 11 is designed to prevent an image to be observed from moving even when the specimen A breaths and beats by keeping the tip of the objective optical system 11 in tight contact with the specimen A.

In such a configuration, it is desirable to satisfy the condition expressed by the following equation (1):

$$|D1a \times \Delta s|/(Ftl)^2 \leq 0.05 \tag{1}$$

where $\Delta s$ represents the total distance over which the imaging optical system 10 moves, $D1a$ represents the gap between the back focal point of the objective optical system 11 and the front focal point of the imaging optical system 10 when the imaging optical system 10 moves to the middle position of its movement range. $Ftl$ represents the focal length of the imaging optical system 10.

The optical detection system 15 includes a collimator optical system 17 that substantially collimates the fluorescent or reflected light guided through the optical fiber 14, a plurality of beam-splitting dichroic mirrors 18 for respective wavelengths, a mirror 19, barrier filters 20, collector lenses 21, and photodetectors 22. In FIG. 1, reference numeral 23 denotes a dichroic mirror, and reference numeral 24 denotes a mirror.

The operation of the thus configured laser scanning microscope 1 according to the present embodiment will be described below.

To observe the specimen A using the laser scanning microscope 1 according to the present embodiment, the tip of the objective optical system 11 is first brought in tight contact with the specimen A. The laser light is then introduced into the microscope body 5 from the laser light source 2 through the optical fiber 4 and deflected off the dichroic mirror 7. The laser light is scanned by the adjacent galvanometric mirrors 8 in two dimensions, and then focused on the specimen A through the pupil projection optical system 9, the imaging optical system 10, and the objective optical system 11.

In the specimen A irradiated with the laser light, fluorescent substances are excited and produce fluorescent light. The objective optical system 11 converts the produced fluorescent light into a collimated or slightly divergent or convergent light beam. The light is formed into an image by the imaging optical system 10 and substantially collimated by the pupil projection optical system 9. The light then reflects off the adjacent galvanometric mirrors 8 and passes through the dichroic mirror 7 and is focused by the coupling optical system 13 into the end of the optical fiber 14. The light is guided through the optical fiber 14 and then detected by the optical detection system 15.

Figure 4:
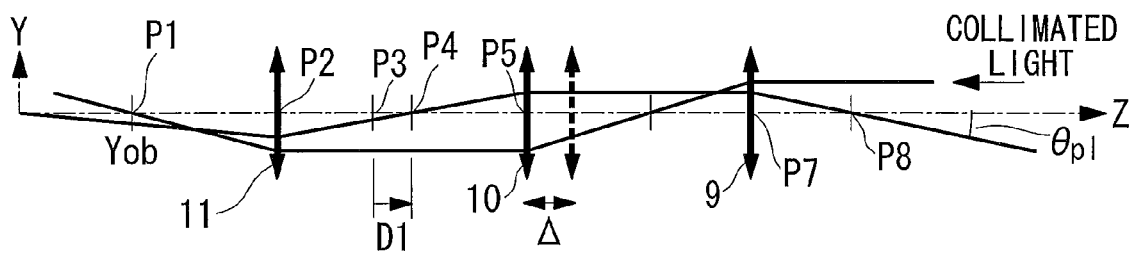
FIG. 4 explains the change in working distance when only an imaging optical system is displaced in the laser scanning microscope shown in FIG. 1.

In this case, for example, as shown in FIG. 4, when the lens driver 12 moves the imaging optical system 10 in the optical axis direction, the working distance of the objective optical system 11 (the distance from the tip of the objective optical system to the focal point) changes.

Therefore, a portion of the specimen A at an arbitrary depth can be imaged without moving the objective optical system 11. Further, a three-dimensional image of the specimen A can be acquired from a plurality of images captured by moving the imaging optical system 10.

The principle of the invention will be described with reference to FIGS. 2 and 3.

Figure 2:
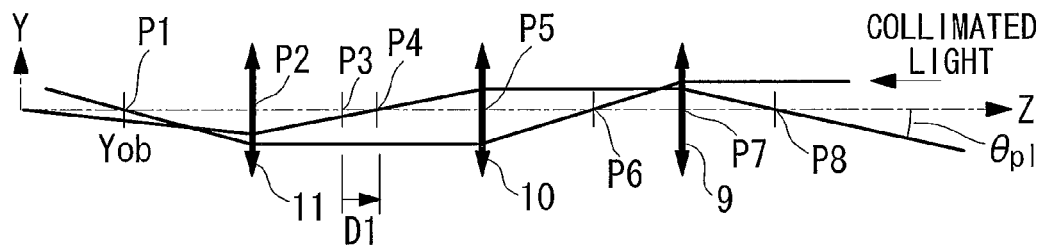
FIG. 2 explains the principle of how the working distance changes when optical systems are displaced in the laser scanning microscope shown in FIG. 1 and shows the optical systems arranged in their reference positions.

FIG. 2 shows reference positions of the optical systems described above, and FIG. 3 shows a state where the optical systems move from the reference positions.

The reference positions are set in such a way that the imaging optical system 10 and the pupil projection optical system 9 form an afocal optical system (that is, the back focal point of the imaging optical system 10 coincides with the front focal point of the pupil projection optical system 9), and that the objective optical system 11 is positioned so that D1 is the gap between the back focal point of the objective optical system 11 and the front focal point of the imaging optical system 10.

Figure 3:
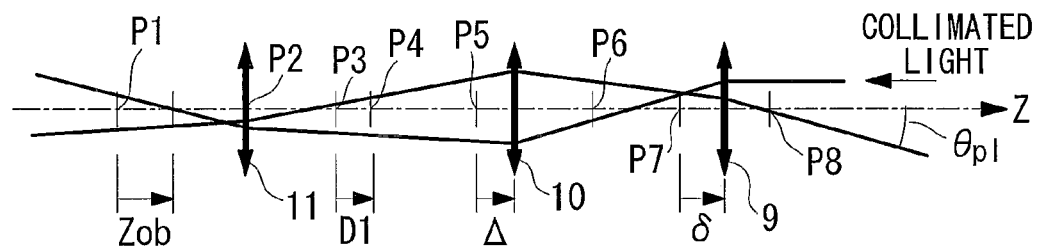
FIG. 3 shows a state where the optical systems are displaced from the reference positions shown in FIG. 2.

In FIGS. 2 and 3, points P1 to P8 are defined as follows:
P1: Front focal point of objective optical system 11
P2: Position of objective optical system 11
P3: Back focal point of objective optical system 11
P4: Front focal point of imaging optical system 10
P5: Position of imaging optical system 10
P6: Back focal point of imaging optical system 10 and front focal point of pupil projection optical system 9
P7: Position of pupil projection optical system 9
P8: Back focal point of pupil projection optical system 9

To make the light beam behind the pupil projection optical system 9 substantially collimated, the following equation should be satisfied:

$$Zwd = n(\Delta - \delta)(Fob/Ftl)^2/(1+A) \qquad (3)$$

When the collimated light beam behind the pupil projection optical system 9 is inclined to the optical axis by an angle θpl, the ratio of the angle θpl to the height Yob perpendicular to the optical axis of the corresponding beam at the focal point by the specimen A, that is, (θpl/Yob), is given as follows:

$$(\theta pl/Yob) = M/Fpl \qquad (4)$$

where $$M = -(Ftl/Fpl)(1+A) \qquad (5)$$

$$A = (D1+\Delta)(\Delta-\delta)/Ftl^2 \qquad (6)$$

Zwd is the amount of change in working distance of objective optical system 11 from reference position P1
Δ is the amount of displacement of imaging optical system 10 from reference position P5
δ is the amount of displacement of pupil projection optical system 9 from reference position P7
n: Refractive index of the specimen
Fob: Focal length of objective optical system 11
Ftl: Focal length of imaging optical system 10
Fpl: Focal length of pupil projection optical system 9
M: Lateral magnification of the image of the specimen formed by the objective optical system 11 and imaging optical system 10
θpl: Angle of collimated light behind pupil projection optical system 9 with respect to optical axis when light ray height of object is Yob (the angle θpl corresponds to half value of scan angle of adjacent galvanometric mirrors 8)

The position of the exit pupil Zp (when the entrance pupil on the objective side is located at infinity) is given by the following equation:

$$Zp = \{\delta - (Fpl/Ftl)^2 \times (D1+\Delta)/(1+A)\} \qquad (7)$$

Therefore, in the laser scanning microscope according to the present embodiment, as shown in FIG. 4, since the pupil projection optical system 9 is fixed and the lens driver 12 drives the imaging optical system 10 in the optical axis direction, δ=0 and the above equations (3) to (6) reduce to the following relationship:

$$Zwd = n \times \Delta (Fob/Ftl)^2/(1+Atl) \qquad (3')$$

Here, $$(\theta pl/Yob) = Mtl/Fpl \qquad (4')$$

but also $$Mtl = -(Ftl/Fob)(1+Atl) \qquad (5')$$

$$Atl = (D1+\Delta) \times \Delta/Ftl^2 \qquad (6')$$

The equation (3') shows that the range over which Δ shifts largely determines the range over which Zwd changes.

The optical systems are desirably arranged in such a way that the range over which the imaging optical system moves is the vicinity of the point Δ=0 (the position where the pupil optical system and the imaging optical system form an afocal optical system) and the back focal point of the objective optical system is located in the vicinity of the front focal point of the imaging optical system, that is, D1 is small.

In such an arrangement, since the equation (6') shows that the amount of change in Atl with change in Δ is small when Δ is in the vicinity of 0, moving the imaging optical system (changing Δ) will not greatly change the lateral magnification Mtl or the ratio of the light ray angle to the object height (θpl/Yob).

Specifically, D1$a$ is desirably set to satisfy equation (1). In such a condition, the changes in Atl and the lateral magnification Mtl can be reduced to approximately 5% or smaller.

EXAMPLE 1

Figure 5:
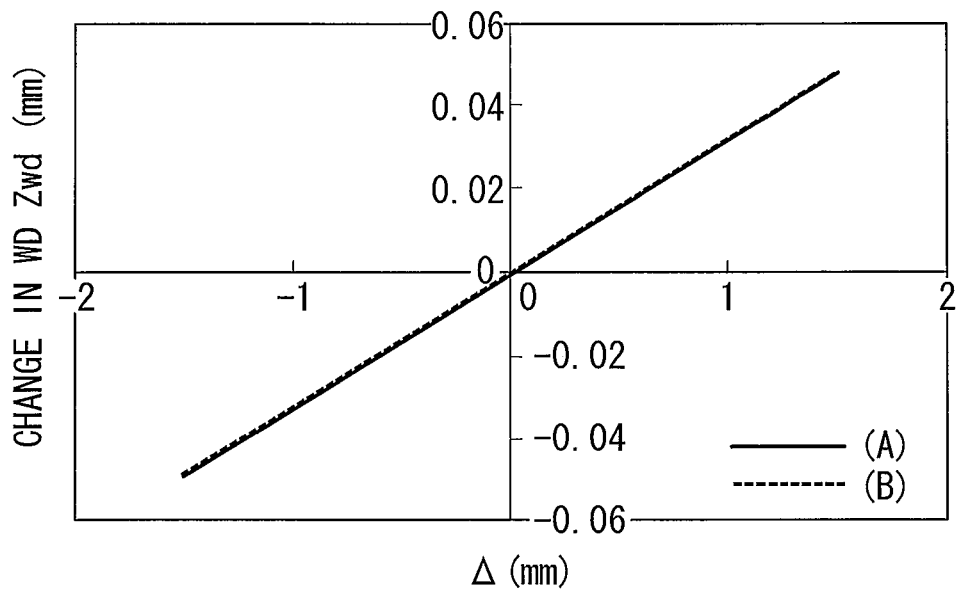
FIG. 5 is a graph plotting the amount of change in working distance against the displacement of the imaging optical system in the laser scanning microscope shown in FIG. 4.
Figure 6:
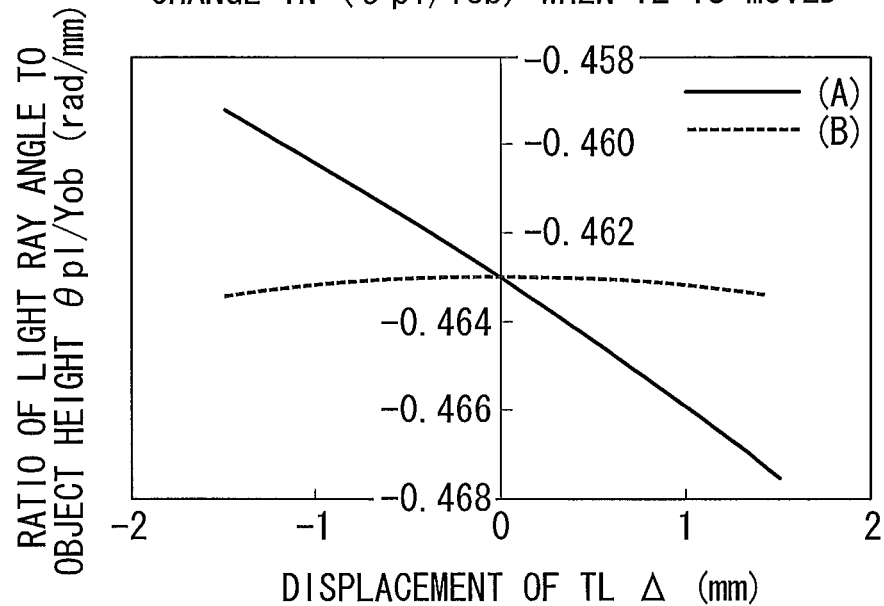
FIG. 6 is a graph plotting the lateral magnification against the displacement of the imaging optical system in the laser scanning microscope shown in FIG. 4.

In FIG. 5, the horizontal axis represents Δ (displacement of the imaging optical system) and the vertical axis represents Zwd (change in the working distance WD), and in FIG. 6, the horizontal axis represents Δ and the vertical axis represents (θpl/Yob), that is, a quantity proportional to the lateral magnification M.

For example, the solid lines (A) in FIGS. 5 and 6 show the results under the following conditions: Fob=9 mm, Ftl=50 mm, Fpl=12 mm, Δ: −1.5 mm to +1.5 mm, that is, Δs=3 mm, and D1$a$=15 mm.

The above values are substituted into the equation (1), and the following equation is derived:

$$|D1a \times \Delta s|/(Ftl)^2 = 0.018 \leq 0.05 \qquad (1)$$

The equation (1) is thus satisfied.

The change in Atl is only 0.0018 throughout the range over which the imaging optical system can move. When the equation (1) is thus satisfied, the change in Atl in (6') becomes small throughout the range over which the imaging lens moves, whereby the change in the lateral magnification Mtl in (5') and the change in the ratio of the light ray angle to the object height (θpl/Yob) in (4') become sufficiently small for satisfactory actual operation even when the working distance WD changes.

Further, when one wishes to greatly reduce the change in lateral magnification, one can simply set D1$a$ to zero. The broken lines (B) in FIGS. 5 and 6 show the results where D1=0 and Fob, Ftl, Fpl, and Δ are the same as the above values.

In this case, since the slope of Atl with respect to Δ becomes zero in the vicinity of the point Δ=0, the change in lateral magnification is very small. In the present embodiment, the change in Atl is 0.0009 over the whole range.

A laser scanning microscope 30 according to a second embodiment of the invention will be described below with reference to FIGS. 7 to 10.

In the description of the present embodiment, those components common to the components of the laser scanning microscope 1 according to the first embodiment described above have the same reference numerals, and no description thereof will be made.

Figure 7:
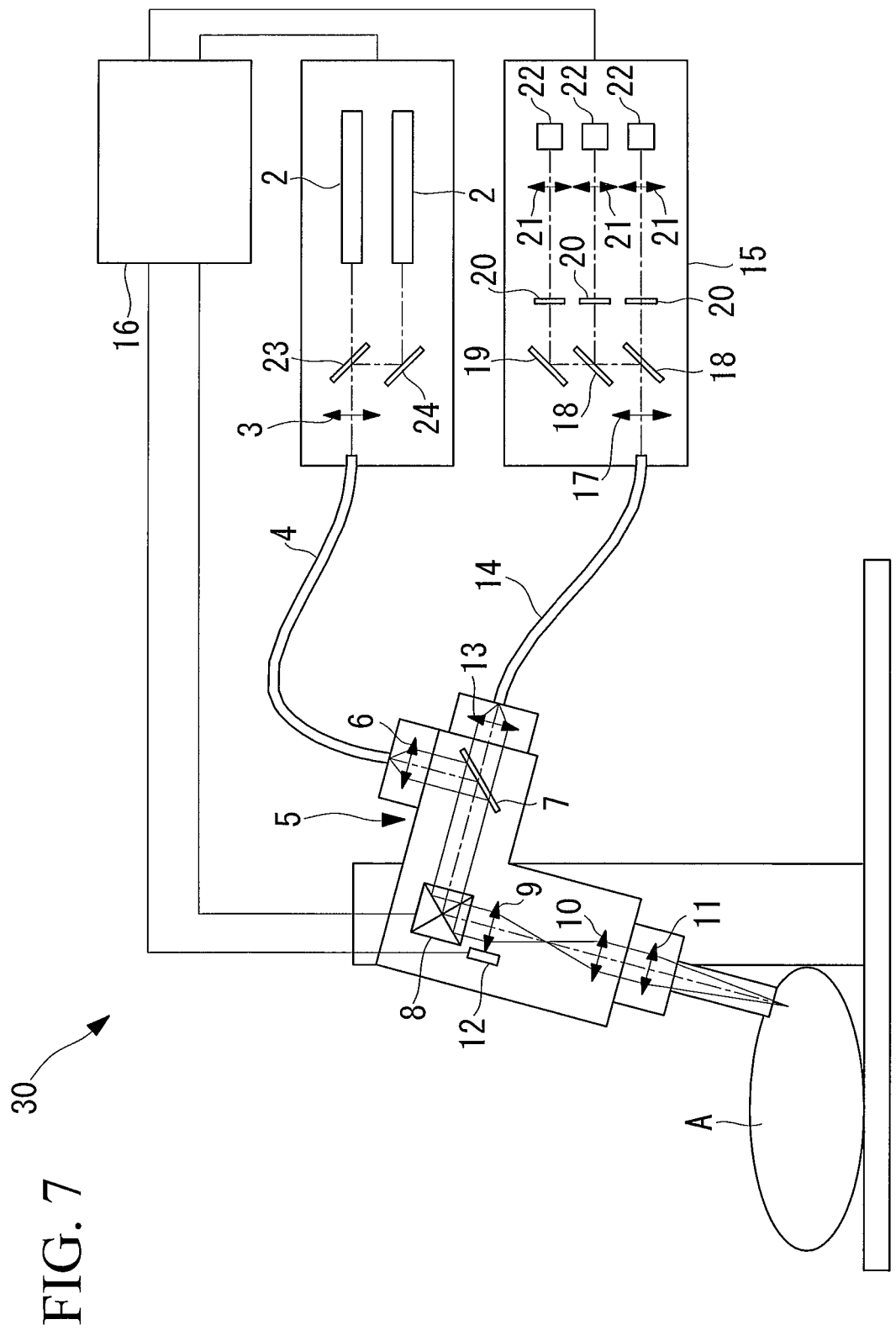
FIG. 7 is an overall configuration diagram showing a laser scanning microscope according to a second embodiment of the invention.

In the laser scanning microscope 30 according to the present embodiment, the lens driver 12 drives the pupil projection optical system 9 in the optical axis direction as shown in FIG. 7, which differs from the laser scanning microscope 1 according to the first embodiment where the lens driver 12 drives the imaging optical system 10 in the optical axis direction.

Since driving the pupil projection optical system 9 in the optical axis direction changes the working distance, a portion of the specimen A at an arbitrary depth can be imaged.

Figure 8:
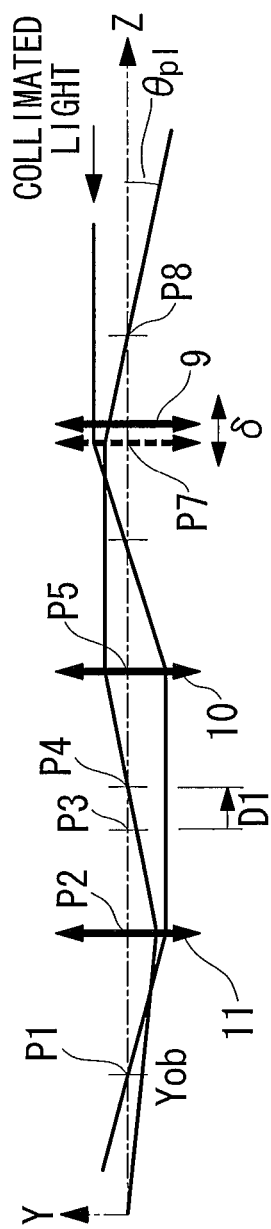
FIG. 8 explains the change in working distance when only an pupil projection optical system is displaced in the laser scanning microscope shown in FIG. 7.

Therefore, in the laser scanning microscope 30 according to the present embodiment, as shown in FIG. 8, since the imaging optical system 10 is fixed and the lens driver 12 drives the pupil projection optical system 9 in the optical axis direction, $\Delta=0$ and the above equations (3) to (6) establish the following relationship:

$$Zwd = x - n \times \delta (Fob/Ftl)^2/(1+Apl) \quad (3'')$$

Here, $$(\theta pl/Yob) = Mpl/Fpl \quad (4'')$$

but $$Mpl = -(Ftl/Fob)(1+Apl) \quad (5'')$$

$$Apl = -\delta \times D1/Ftl^2 \quad (6'')$$

The equation (3") shows that the range over which δ shifts largely determines the range over which Zwd changes. The back focal point of the objective optical system 11 is desirably located in the vicinity of the front focal point of the imaging optical system 10; that is, so that D1 is small. When D1 is small, moving the pupil projection optical system (changing δ) will not greatly change the lateral magnification Mpl or the ratio of the light ray angle to the object height (θpl/Yob).

The equation (6") shows that the change in Apl is proportional to D1 and δ.

Since the range over which δ shifts largely determines the range over which Zwd changes, the range of δ does not change greatly. Therefore, D1 largely determines the change in Mpl.

Specifically, the following equation involving the total amount of movement δs of the pupil projection lens is preferably satisfied:

$$|D1 \times \Delta s|/Ftl^2 \leq 0.05 \quad (2)$$

The change in Apl can be reduced to 0.05 or smaller in such case.

EXAMPLE 2

Figure 9:
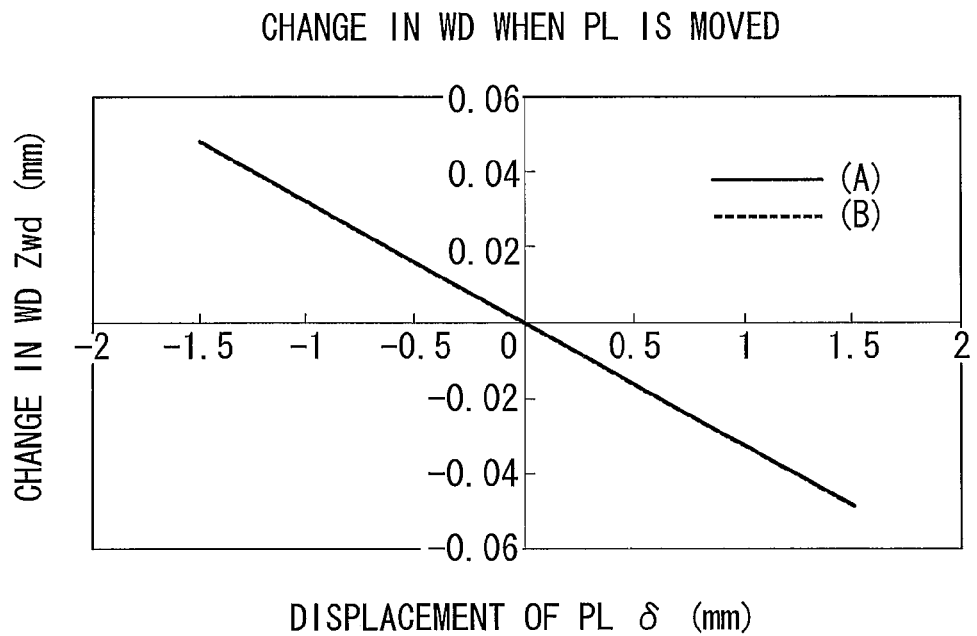
FIG. 9 is a graph plotting the amount of change in working distance against the displacement of the pupil projection optical system in the laser scanning microscope shown in FIG. 8.
Figure 10:
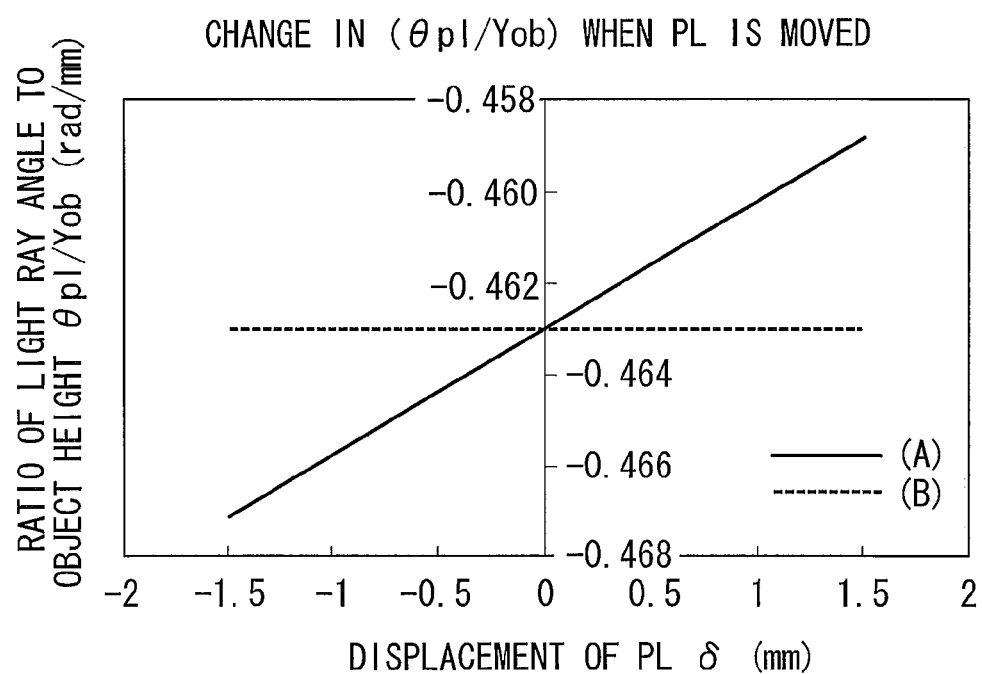
FIG. 10 is a graph plotting the lateral magnification against the displacement of the pupil projection optical system in the laser scanning microscope shown in FIG. 8.

In FIG. 9, the horizontal axis represents δ (displacement of the pupil projection optical system) and the vertical axis represents Zwd (change in the working distance WD), and in FIG. 10, the horizontal axis represents δ and the vertical axis represents (θpl/Yob), that is, a quantity proportional to the lateral magnification.

For example, the solid lines (A) in FIGS. 9 and 10 show the results under the following conditions: Fob=9 mm, Ftl=50 mm, Fpl=12 mm, δ: −1.5 mm to +1.5 mm, that is, δs=3 mm, and D1a=15 mm.

When the above values are substituted into the condition (2), the following condition is derived:

$$|D1 \times \delta s|/Ftl^2 = 0.018 \leq 0.05$$

The equation (2) is thus satisfied.

The change in Apl is only 0.0018. When the equation (2) is thus satisfied, the change in Apl in (6") becomes small, whereby the change in the lateral magnification Mpl in (5") and the change in the ratio of the light ray angle to the object height (θpl/Yob) in (4") become sufficiently small for satisfactory actual operation even when the working distance WD changes.

Further, when one wishes to greatly reduce the change in lateral magnification, one can simply set D1 to zero. The broken lines (B) in FIGS. 9 and 10 show the results obtained when D1=0 and Fob, Ftl, Fpl, and Δ are the same as the above values.

In this case, since Apl is always zero, regardless of the value of δ, the lateral magnification will not change at all.

A laser scanning microscope 40 according to a third embodiment of the invention will be described below with reference to FIGS. 11 and 12.

In the description of the present embodiment, those components common to the components of the laser scanning microscope 1 according to the first embodiment described above have the same reference numerals, and no description thereof will be made.

Figure 11:
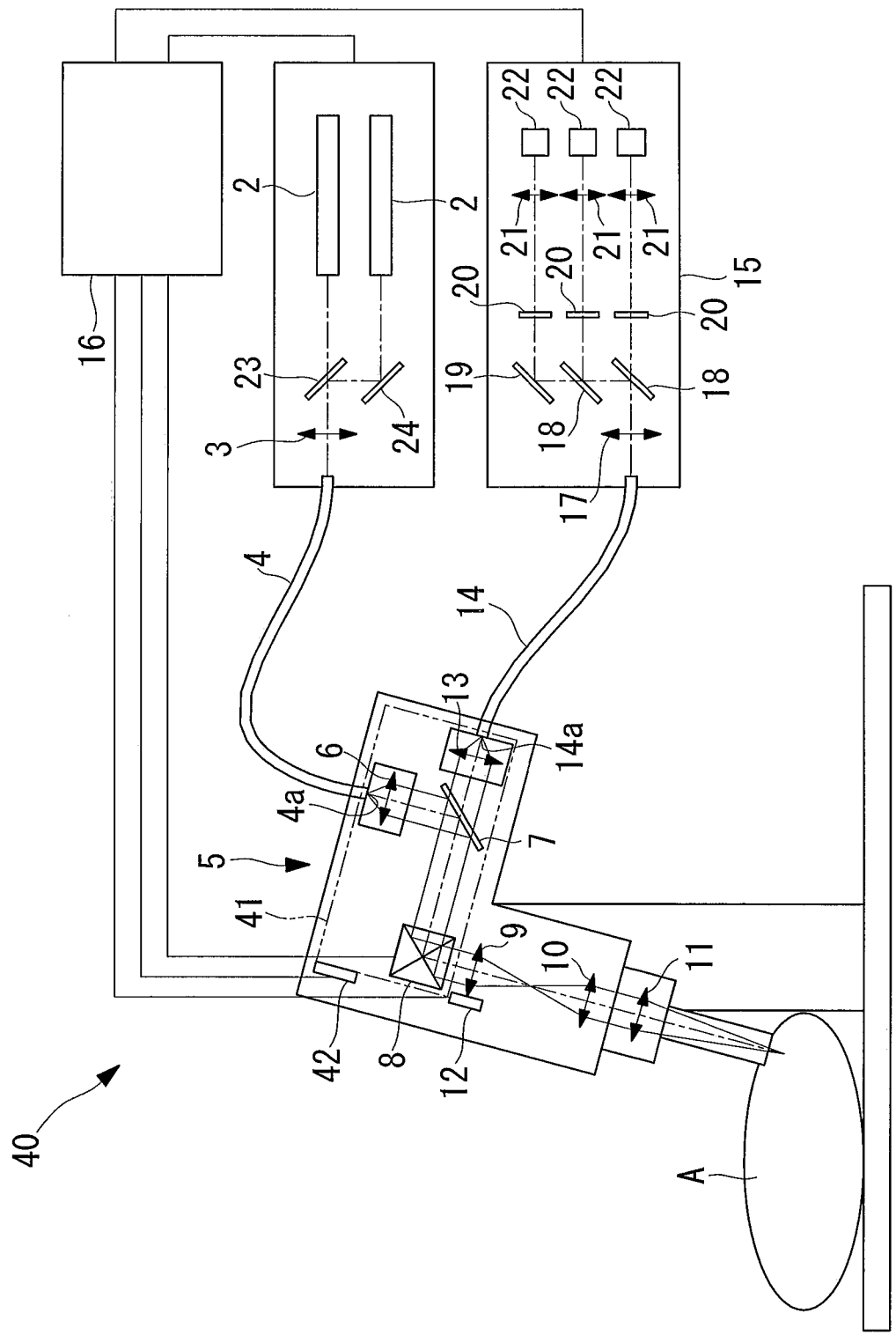
FIG. 11 is an overall configuration diagram showing a laser scanning microscope according to a third embodiment of the invention.

The laser scanning microscope 40 according to the present embodiment is similar to the laser scanning microscope 30 according to the second embodiment where the lens driver 12 drives the pupil projection optical system 9 in the optical axis direction, but in addition includes a scan optical system 41 including a radiation exit end (light output portion) 4a of the optical fiber 4, a radiation entrance end (light receiving portion) 14a of the optical fiber 14, the collimator optical system 6, the coupling optical system 13, the dichroic mirror 7, and the adjacent galvanometric mirrors 8, and also a pupil position adjuster 42 that integrally moves the scan optical system 41 in the optical axis direction of the pupil projection optical system 9, as shown in FIG. 11.

Integrally moving the scan optical system 41 in the optical axis direction of the pupil projection optical system 9 by actuating the pupil position adjuster 42 allows the pupil position to coincide with the adjacent galvanometric mirrors 8.

The adjustment of the position of the exit pupil Zp by using the pupil position adjuster 42 may be carried out in accordance with the equation (7). It is noted that the point Zp=0 coincides with the position of the back focal point of the pupil projection optical system 9 located in the reference position shown in FIG. 2.

When the imaging optical system 10 is fixed and the pupil projection optical system 9 is moved in the optical axis direction as shown in FIG. 11, the equation (7) is modified as follows:

$$Zp = \{\delta - (Fpl/Ftl)^2 \times D1/(1+A)\}$$

Figure 12:
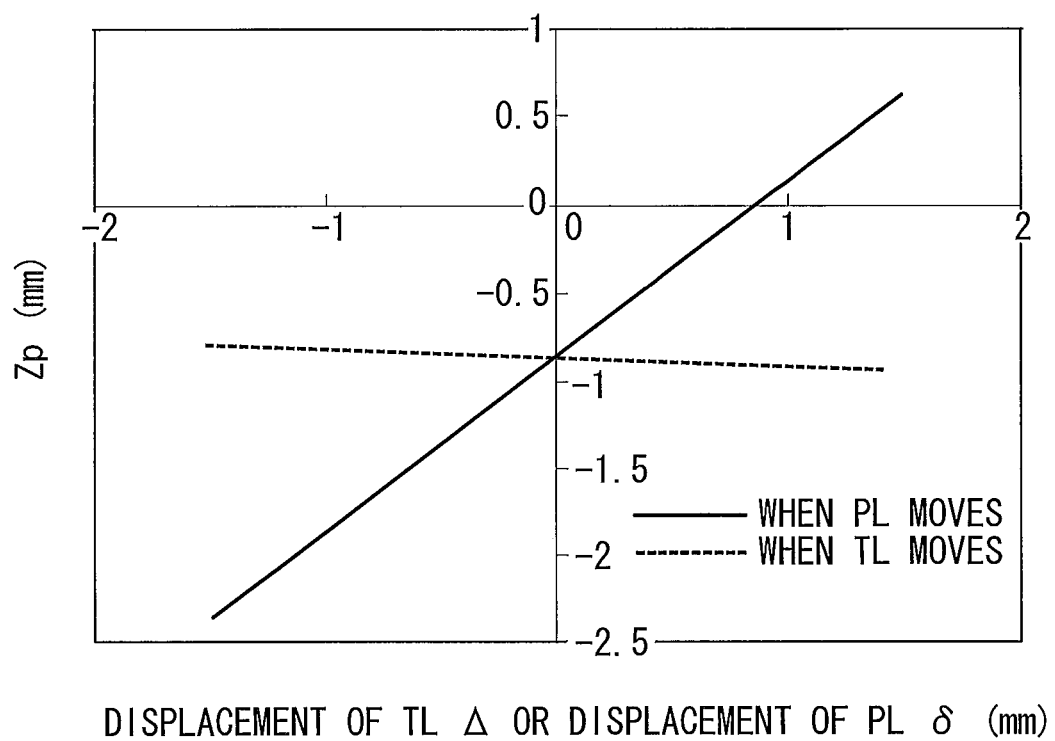
FIG. 12 is a graph plotting the displacement of the position of an exit pupil against the displacement of an imaging optical system or a pupil projection optical system in the laser scanning microscope shown in FIG. 11.

When the equation (1) or (2) is satisfied, 1>>A and hence the following equation is satisfied:

$$Zp = \delta - (Fpl/Ftl)^2 \times D1$$

and the displacement δ of the pupil projection optical system 9 is a linear function of the position of the exit pupil Zp, changing approximately the same amount as δ does, as shown in FIG. 12.

While the present embodiment has been described with reference to the case where the lens driver 12 drives the pupil projection optical system 9, alternatively the pupil projection optical system 9 can be fixed and the imaging optical system 10 can be moved in the optical axis direction. In this case, the equation (7) is modified as follows:

$$Zp = -(Fpl/Ftl)_2 \times (D1 + \Delta)$$

Therefore, when is displaced by, the position of the exit pupil Zp is a linear function of the displacement $\Delta$ of the imaging optical system 10, shifting by the amount $-(Fpl/Ftl)^2 \times \Delta$ as shown in FIG. 12.

Figure 13:
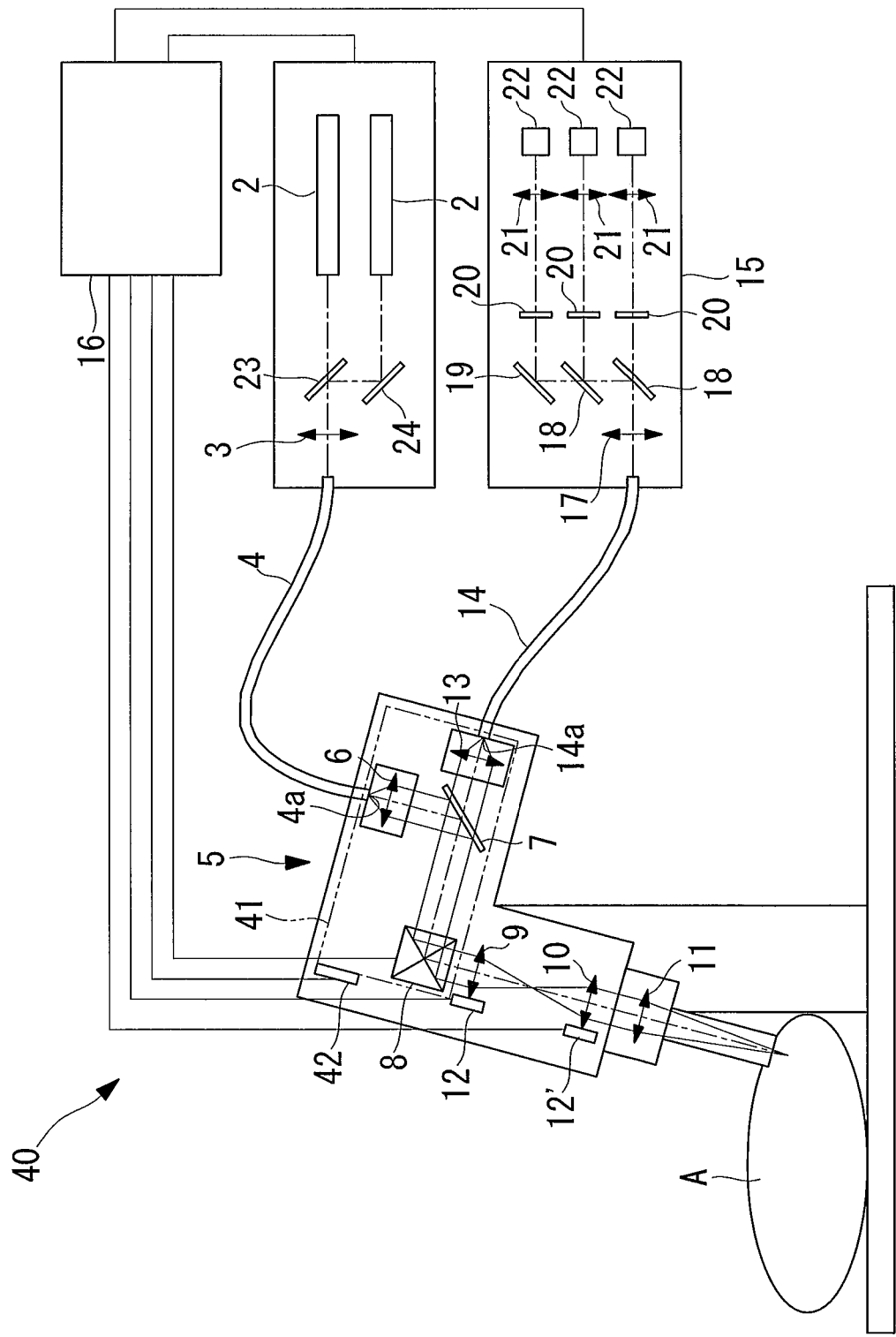
FIG. 13 is an overall configuration diagram showing a modification of the laser scanning microscope shown in FIG. 11, the laser scanning microscope including a imaging optical system, pupil projection optical system, and scan optical system which are movable.

Even when the position of the back focal point of the objective optical system 11 varies with respect to the abutting position of the objective optical system 11 according to the type of the objective optical system 11, providing lens drivers 12 and 12' for both the pupil projection optical system 9 and the imaging optical system 10 as shown in FIG. 13 allows adjustment to be readily made. That is, the lens driver 12' is first actuated to move the imaging optical system 10 so that the front focal point of the imaging optical system 10 coincides with the back focal point of the objective optical system 11. The lens driver 12 then moves the pupil projection optical system 9 in the optical axis direction so as to adjust the working distance of the objective optical system 11. Finally, the pupil position adjuster 42 is actuated to move the scan optical system 41 so as to adjust the pupil position.

A focus adjustment unit 101 according to a fourth embodiment of the invention will be described below with reference to FIGS. 14 to 16.

Figure 14:
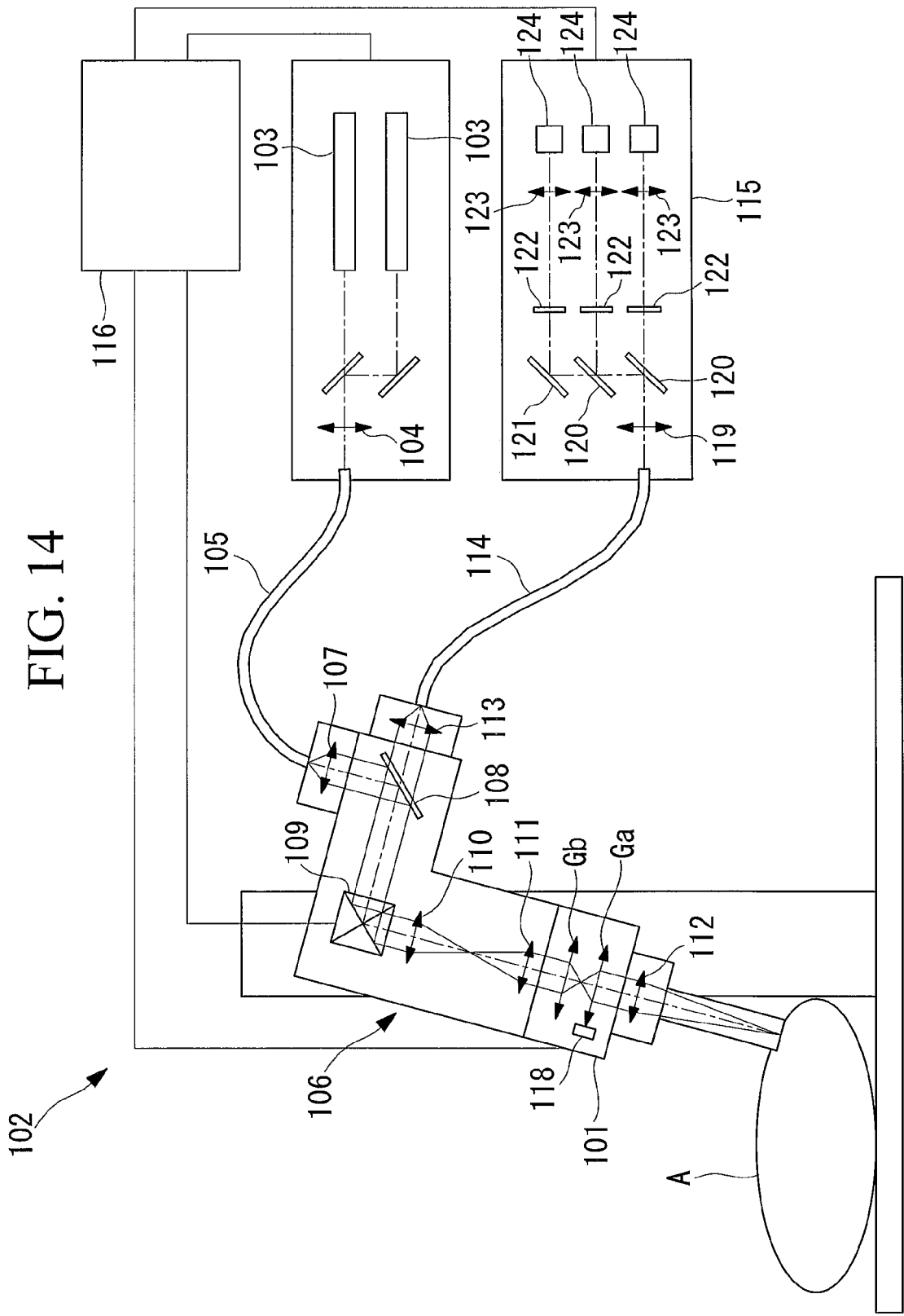
FIG. 14 is an overall configuration diagram showing a laser scanning microscope according to a fourth embodiment of the invention.

The focus adjustment unit 101 according to the present embodiment is part of a laser scanning microscope 102, as shown in FIG. 14.

The laser scanning microscope 102 according to the present embodiment includes a laser light source 103 that emits laser light, a coupling optical system 104 that focuses the laser light from the laser light source 103, an optical fiber 105 that guides the laser light focused by the coupling optical system 104, a microscope body 106 that is connected to the laser light source via the optical fiber 105, a optical detection system 115, a controller 116 that controls the above components, and a display device (not shown) that displays a fluorescent light or reflected light image detected by the optical detection system 115.

The microscope body 106 includes a collimator optical system 107 that converts the laser light that has exited from the optical fiber 105 into a substantially collimated light beam, a dichroic mirror 108 that deflects the laser light substantially collimated by the collimator optical system 107, adjacent galvanometric mirrors 109 that scan the laser light deflected off the dichroic mirror 108 in two dimensions, a pupil projection optical system 110 that focuses the laser light scanned by the adjacent galvanometric mirrors 109, an imaging optical system 111 and an objective optical system 112, and the focus adjustment unit 101 according to the present embodiment disposed between the imaging optical system 111 and the objective optical system 112.

The microscope body 106 includes the dichroic mirror 108 that transmits fluorescent light or reflected light that has returned from a specimen A via the objective optical system 112, the focus adjustment unit 101, the imaging optical system 111, the pupil projection optical system 110, and the adjacent galvanometric mirrors 109, and further includes a coupling optical system 113 that focuses the transmitted light onto an optical fiber 114, and an optical fiber 114 that guides the fluorescent light or reflected light that has returned from the specimen A and has been focused by the coupling optical system 113.

The microscope body 106 is disposed so as to be movable in three mutually orthogonal axial (XYZ) directions and also rotatable around these axes, so that the position and the angle of the tip of the objective optical system 112 can be arbitrarily adjusted.

The adjacent galvanometric mirrors 109 are designed to scan in directions substantially perpendicular to the optical axis of the objective optical system 112. The intensity distribution of the light from the portion of the specimen A that corresponds to the present deflection angle of the adjacent galvanometric mirrors 109 is displayed on the display.

The objective optical system 112 is designed to prevent the image to be observed from moving even during breaths and heartbeats of the specimen A, by keeping the tip of the objective optical system 112 in tight contact with the specimen A.

The focus adjustment unit 101 according to the present embodiment includes a front-group optical system Ga, a rear-group optical system Gb, and a lens driver 118 that drives the front-group optical system Ga.

Both the front-group optical system Ga and the rear-group optical system Gb are groups of lenses having positive refractive power, and an intermediate imaging point is located between the front-group optical system Ga and the rear-group optical system Gb.

In such a configuration, the following equation (8) is preferably satisfied:

$$D1a \times \Delta s |/(Fla)^2 \leq 0.05 \qquad (8)$$

where $\Delta s$ represents the total distance over which the front-group optical system Ga moves, $D1a$ represents the gap between the back focal point of the objective optical system 112 and the front focal point of the front-group optical system Ga when the front-group optical system Ga has moved to the middle position of its movement range, and $Fla$ represents the focal length of the front-group optical system Ga.

The optical detection system 115 includes a collimator lens 119 that substantially collimates the fluorescent or reflected light guided through the optical fiber 114, a plurality of beam-splitting dichroic mirrors 120 for respective wavelengths and a mirror 121, barrier filters 122, collector lenses 123, and photodetectors 124.

The operation of the thus configured focus adjustment unit 101 and laser scanning microscope 102 according to the present embodiment will be described below.

To observe the specimen A using the laser scanning microscope 102 according to the present embodiment, the tip of the objective optical system 112 is first brought in tight contact with the specimen A. The laser light is introduced into the microscope body 106 from the laser light source 103 through the optical fiber 105 and then deflected off the dichroic mirror 108. The laser light is scanned by the adjacent galvanometric mirrors 109 in two dimensions, and then focused on the specimen A through the pupil projection optical system 110, the imaging optical system 111, the focus adjustment unit 101, and the objective optical system 112.

In the specimen A irradiated with the laser light, fluorescent substances are excited and produce fluorescent light. The objective optical system 112 converts the produced fluorescent light into a substantially collimated light beam or slightly divergent or convergent light. The light is substantially collimated by the focus adjustment unit 101, focused by the imaging optical system 111, and substantially collimated by the pupil projection optical system 110. The light then is deflected by the adjacent galvanometric mirrors 109, passes through the dichroic mirror 108, and is focused by the coupling optical system 113 into the end of the optical fiber 114. The light is guided through the optical fiber 114 and then detected by the optical detection system 115.

Figure 15:
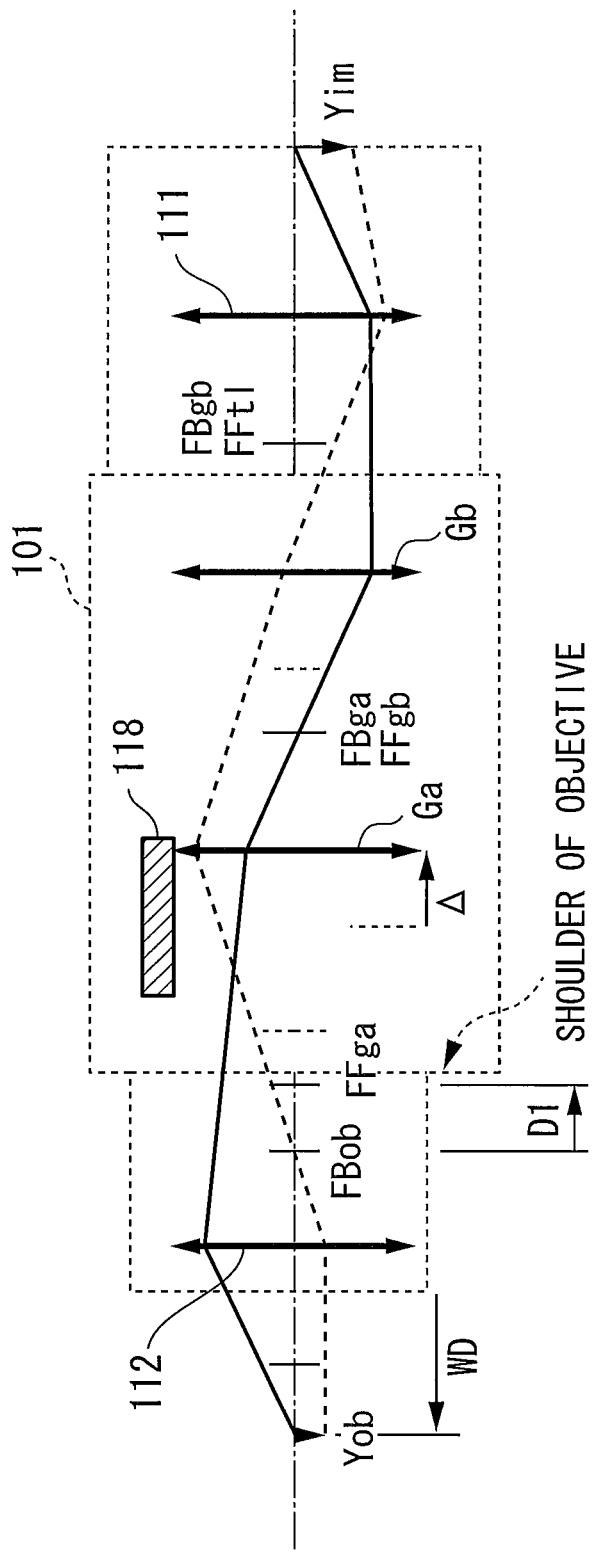
FIG. 15 shows a focus adjustment unit (Example 3) according to the fourth embodiment used in the laser scanning microscope shown in FIG. 14.
Figure 16:
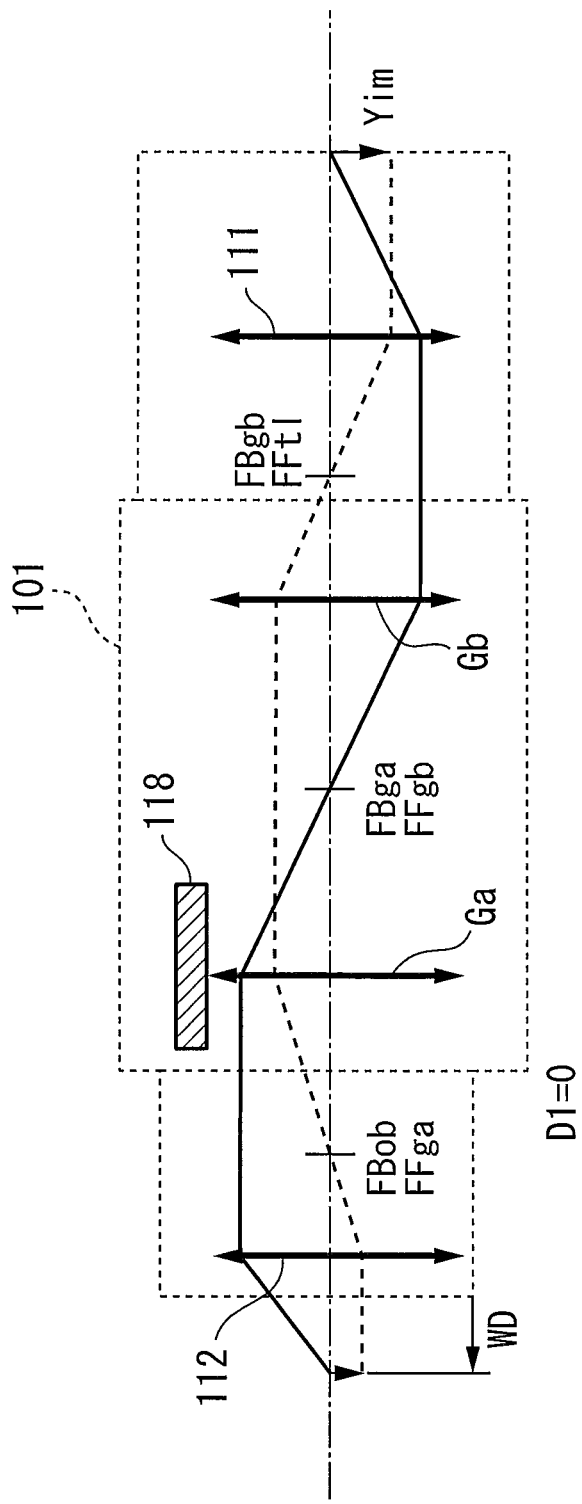
FIG. 16 shows a state where the front focal point of a front-group optical system shown in the focus adjustment unit coincides with the back focal point of an objective lens shown in FIG. 15.

In this case, for example, as shown in FIGS. 15 and 16, when the lens driver 118 moves the front-group optical system Ga in the optical axis direction, the divergence angle of the light between the focus adjustment unit 101 and the objective optical system 112 changes, and hence the working distance of the objective optical system 112 (the distance from the tip of the objective optical system to the focal point) changes.

Therefore, a portion of the specimen A at an arbitrary depth can be imaged without moving the objective optical system 112. Further, a three-dimensional image of the specimen A can be acquired by capturing a plurality of images while moving the front-group optical system Ga.

The principle of the invention will be described with reference to FIG. 17.

Figure 17:
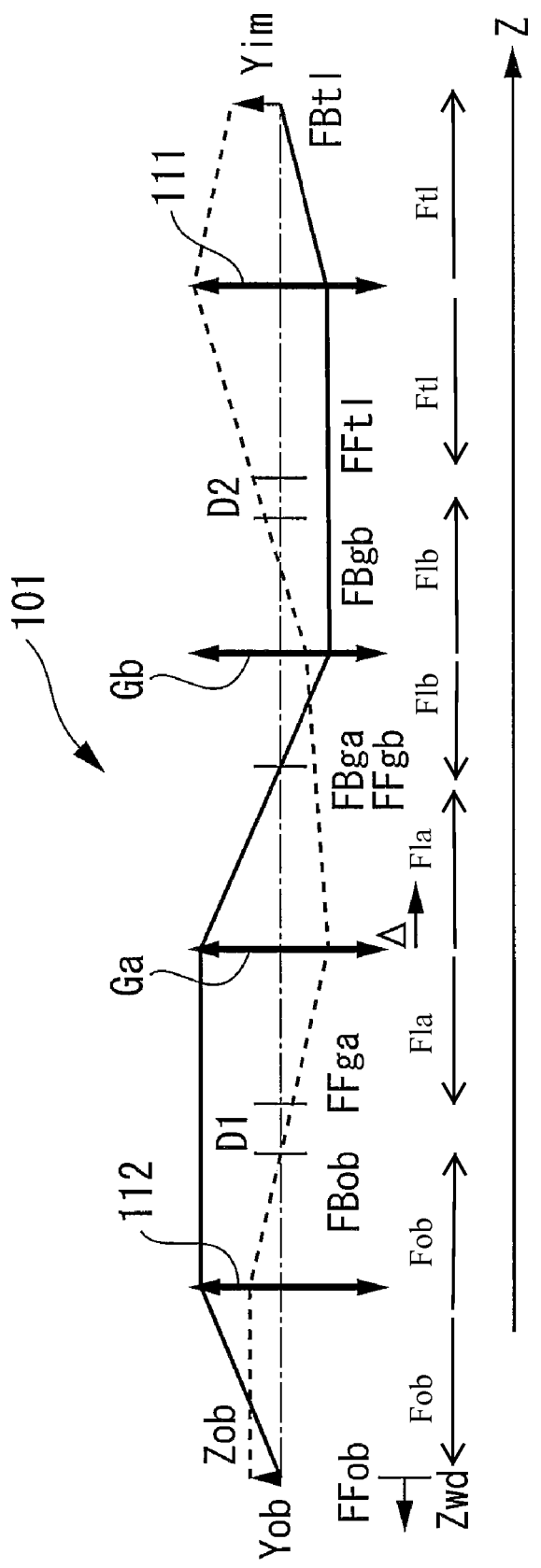
FIG. 17 explains the principle of the focus adjustment unit according to the fourth embodiment used in the laser scanning microscope shown in FIG. 14.

The reference characters in FIG. 17 are defined as follows:
$\Delta$: Position of front-group optical system Ga in focus adjustment unit 101
$\delta$: Position of rear-group optical system Gb in focus adjustment unit 101
Fla: Focal length of front-group optical system Ga in focus adjustment unit 101
Flb: Focal length of rear-group optical system Gb in focus adjustment unit 101
n: Refractive index of specimen A
Fob: Focal length of objective optical system 112
Ftl: Focal length of imaging optical system 111
D1: Z coordinate of front focal point of front-group optical system Ga in focus adjustment unit 101, taking the point of origin to be the back focal point of objective optical system 112
D2: Z coordinate of front focal point of imaging optical system 111, taking the point of origin to be the back focal point of rear-group optical system Gb in focus adjustment unit 101

Here, the side toward the imaging optical system 111 is the back, the side toward the objective optical system 112 is the front, and the Z axis is the optical axis with the back side thereof having positive values. The coordinates of the focal points of the optical systems, $\Delta$, $\delta$, D1, and D2 are the coordinates when the focus adjustment unit 101 forms an afocal optical system.

Other reference characters in FIG. 17 are defined as follows:
FFob: Front focal point of objective optical system 112
FBob: Back focal point of objective optical system 112
Zob: Point to be observed
FFga: Front focal point of front-group optical system Ga in focus adjustment unit 101
FBga: Back focal point of front-group optical system Ga in focus adjustment unit 101
FFgb: Front focal point of rear-group optical system Gb in focus adjustment unit 101
FBgb: Back focal point of rear-group optical system Gb in focus adjustment unit 101
FFtl: Front focal point of imaging optical system 111

When the front-group optical system Ga moves by $\Delta$ and the rear-group optical system Gb moves by $\delta$, the amount of change Zwd in the working distance of the objective optical system 112 is given as follows:

$$Zwd = n(\Delta - \delta) \times (Fob/Fla)^2 / (1+A) \tag{10}$$

The lateral magnification M is given as follows:

$$M = (Ftl/Fob)(Fla/Flb)(1+A) \tag{11}$$

$$\text{where } A = (D1+\Delta)(\Delta-\delta)/Fla^2 \tag{12}$$

It is noted that the equations (10) to (12) are also satisfied when each of the optical systems has a negative refractive index.

The equation (10) shows that when the rear-group optical system Gb is fixed (that is, $\delta=0$), the range over which $\Delta$ shifts largely determines the range over which Zwd changes.

The optical systems are arranged in such a way that the front-group optical system Ga moves in the vicinity of the point $\Delta=0$ (the position where the rear-group optical system Gb and the front-group optical system Ga form an afocal optical system) and the back focal point of the objective optical system 112 is located in the vicinity of the front focal point of the front-group optical system Ga, that is, so that D1 is small.

In such an arrangement, since the equation (12) shows that the amount of change in $\Delta$ is small when $\Delta$ changes in the vicinity of the point $\Delta=0$, moving the front-group optical system Ga (changing $\Delta$) will not greatly change the lateral magnification M.

Specifically, D1a is desirably set so that the equation (8) is satisfied. In such a condition, the changes in A in the equation (12) and the lateral magnification M can be reduced to approximately 5% or smaller.

EXAMPLE 3

An example of the focus adjustment unit 101 according to the fourth embodiment of the invention will be specifically described with numerical values. In FIG. 15, the focal length Fob of the objective optical system 112 is 9 mm; the focal length Fla of the front-group optical system Ga is 22.5 mm; the focal length Flb of the rear-group optical system Gb is 22.5 mm; and the focal length Ftl of the imaging optical system 111 is 60 mm.

Figure 18:
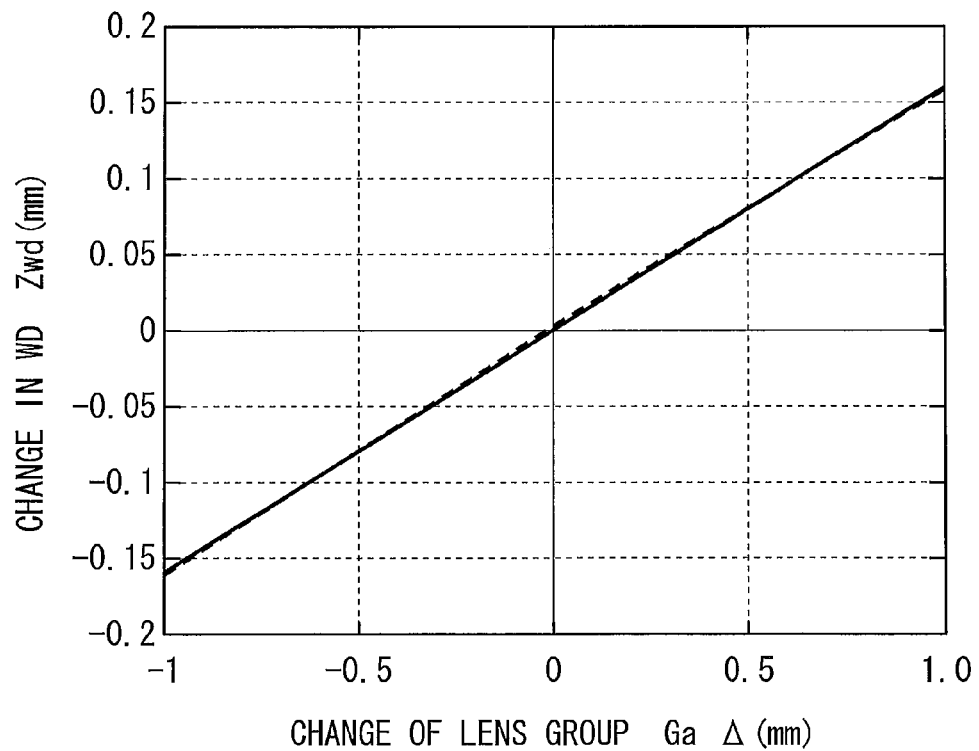
FIG. 18 shows graphs illustrating the amount of change in working distance of the objective lens versus the displacement of the front-group optical system in the focus adjustment unit when the optical systems are located in the positions shown in FIGS. 15 and 16.
Figure 19:
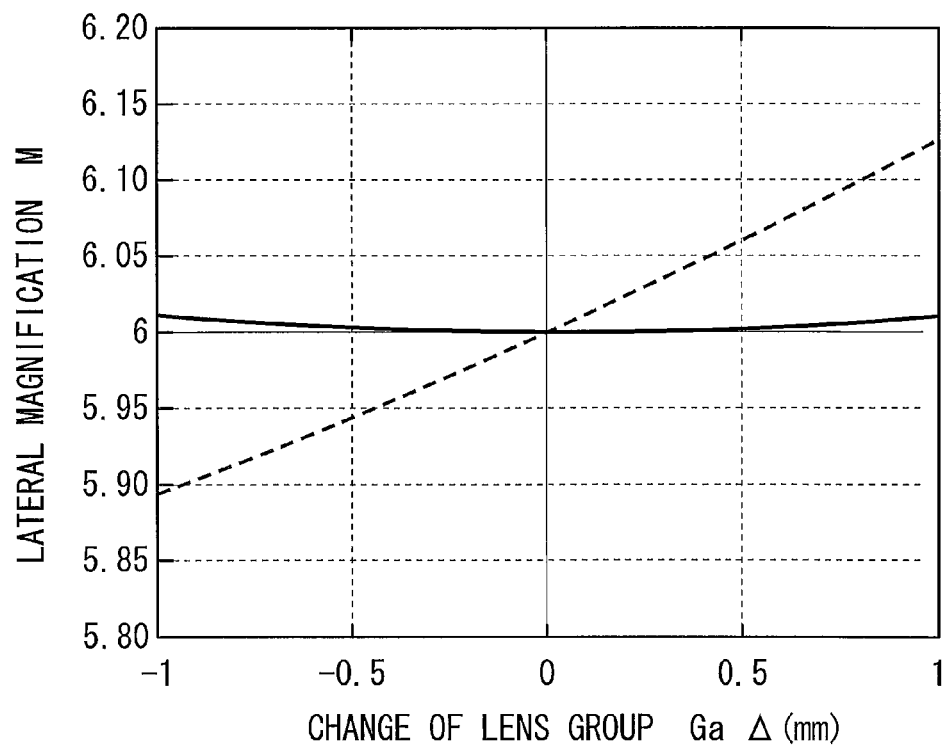
FIG. 19 shows graphs illustrating the lateral magnification versus the displacement of the front-group optical system in the focus adjustment unit when the optical systems are located in the positions shown in FIGS. 15 and 16.

In FIG. 15, further assume that D1 and D1a are 10 mm; D2 is 0 mm; and $\Delta$ changes from $-1$ mm to $+1$ mm, that is, $\Delta s=2$ mm. The broken lines in FIGS. 18 and 19 show the amount of change in the working distance Zwd of the objective optical system 112 and the change in the lateral magnification M versus the displacement $\Delta$ (horizontal axis) of the front-group optical system Ga, respectively.

When the above values are substituted into the equation (8), the following equation is derived:

$$D1a \times \Delta s / (Fla)^2 = 10 \times 2 / 22.5^2 \approx 0.0395 \leq 0.05$$

The equation (8) is thus satisfied.

That is, even when the working distance of the objective optical system 112 is changed, the change in the lateral magnification M can be kept sufficiently small (5% or smaller).

On the other hand, when the equation (8) is not satisfied, changing the working distance of the objective optical system 112 will disadvantageously change the lateral magnification M greatly.

When the state shown in FIG. 15 is changed to that shown in FIG. 16, that is, D1=D1a=0 mm, the amount of change in A in the equation (12) is zero when $\Delta$ changes in the vicinity of the point $\Delta=0$. Therefore, the change in the lateral magnification M can be further reduced.

The solid lines in FIGS. 18 and 19 show the dependence of change in the working distance Zwd of the objective optical system 112 and the change in the lateral magnification M on the displacement $\Delta$ (horizontal axis) of the front-group optical system Ga. The graphs show that the change in the magnification M can be greatly reduced.

If Zpim is the position of the exit pupil of the whole optical system, it is preferable that 1/Zpim is approximately zero. To this end, D2 is preferably as small as possible.

EXAMPLE 4

Figure 20:
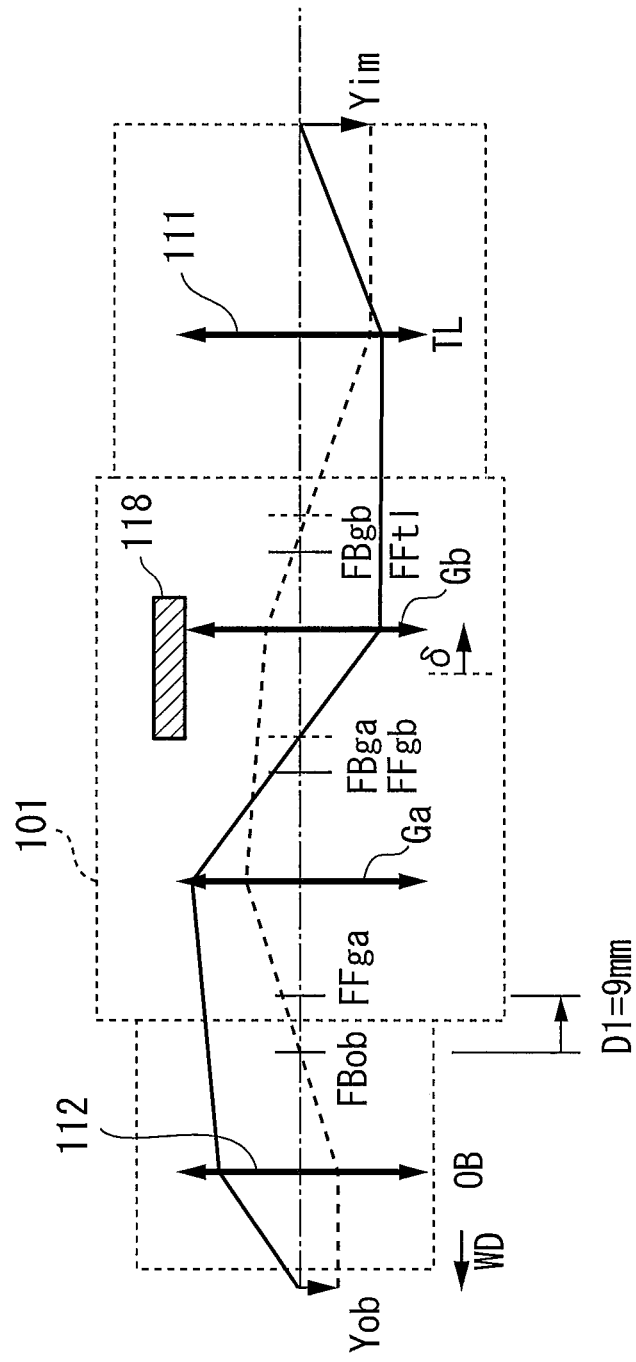
FIG. 20 shows a focus adjustment unit according to Example 4 used in the laser scanning microscope shown in FIG. 14.
Figure 21:
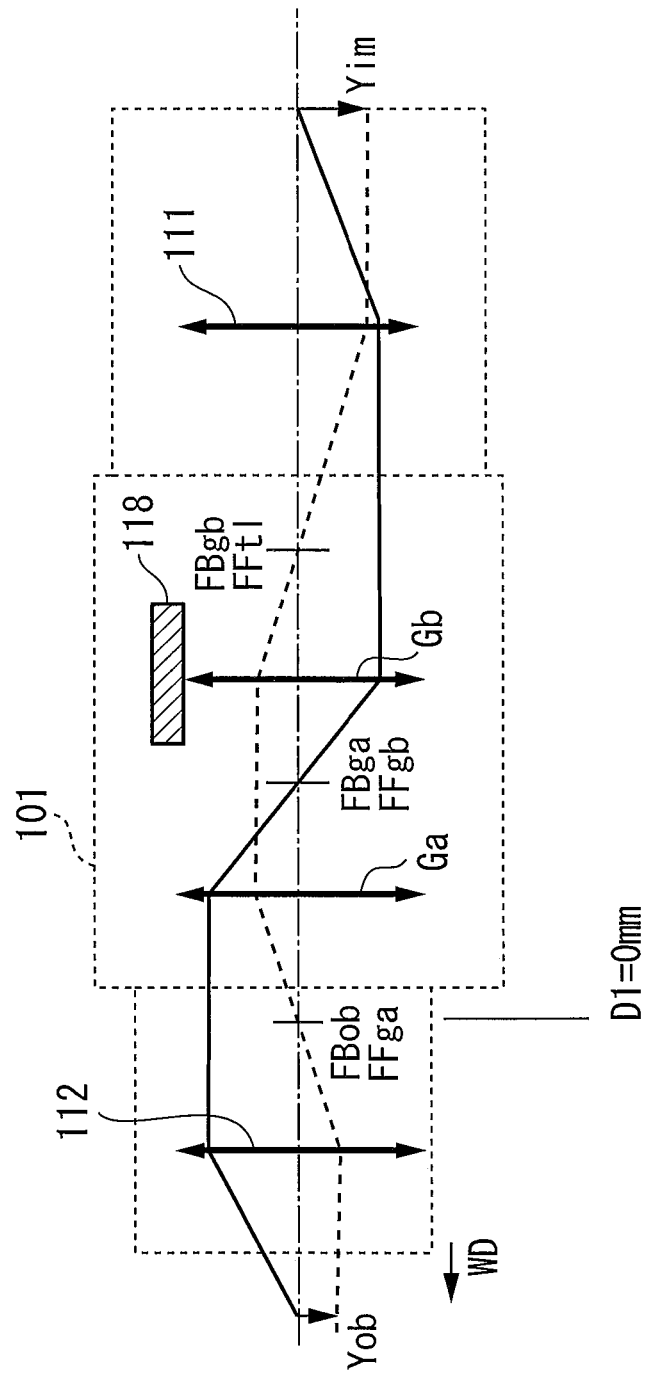
FIG. 21 shows a state where the front focal point of a front-group optical system in the focus adjustment unit shown in FIG. 20 coincides with the back focal point of an objective lens.
Figure 22:
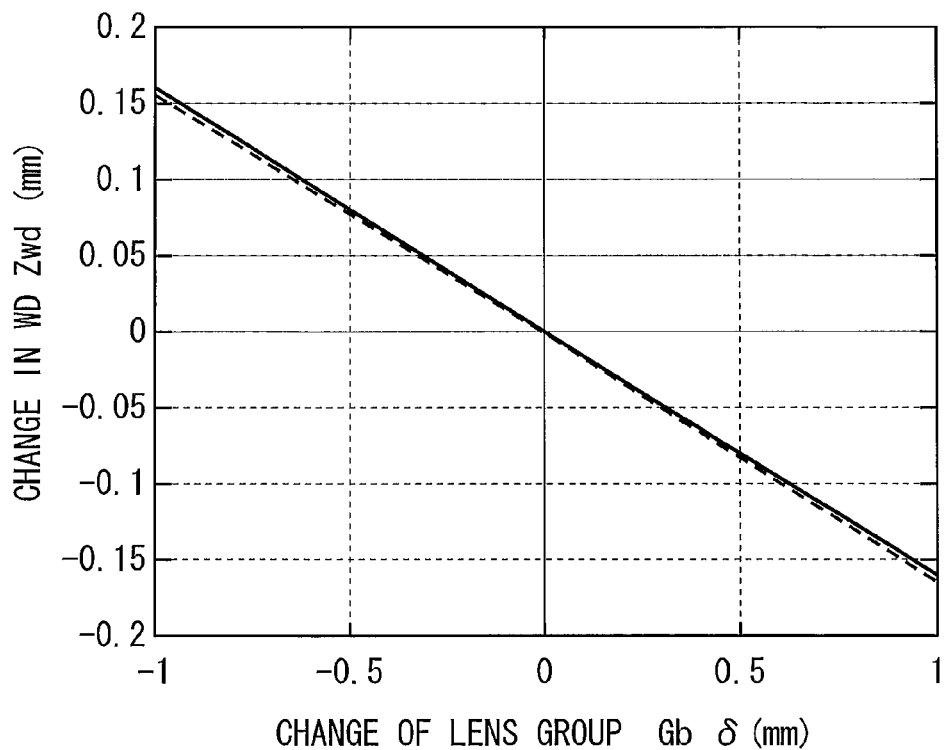
FIG. 22 is a graph plotting the amount of change in working distance of the objective lens against the displacement of a rear-group optical system in the focus adjustment unit in FIGS. 20 and 21.

In Example 3, the lens driver 118 moves the front-group optical system Ga in the optical axis direction. Alternatively, the front-group optical system Ga may be fixed (that is, $\Delta=0$), and the rear-group optical system Gb may be moved in the optical axis direction, as shown in FIGS. 20 to 22.

The optical systems are desirably arranged in such a way that the back focal point of the objective optical system 112 is located in the vicinity of the front focal point of the front-group optical system Ga, that is, so that D1 is small.

In such an arrangement, since the equation (12) shows that the amount of change in A with change in 5 is small, even if the rear-group optical system Gb is moved ($\delta$ is changed) the change in the lateral magnification M can be kept small.

Specifically, D1$a$ is desirably set to satisfy the following equation (9).

$$|D1 \times \delta s|/(Fla)^2 \leq 0.05 \quad (9)$$

The change in A in the equation (12) can be reduced to approximately 5% or smaller if the above condition is satisfied.

In the equation (9), $\delta s$ represents the total distance over which the rear-group optical system Gb moves, D1 represents the gap between the back focal point of the objective optical system 112 and the front focal point of the front-group optical system Ga, and Fla represents the focal length of the front-group optical system Ga.

Figure 23:
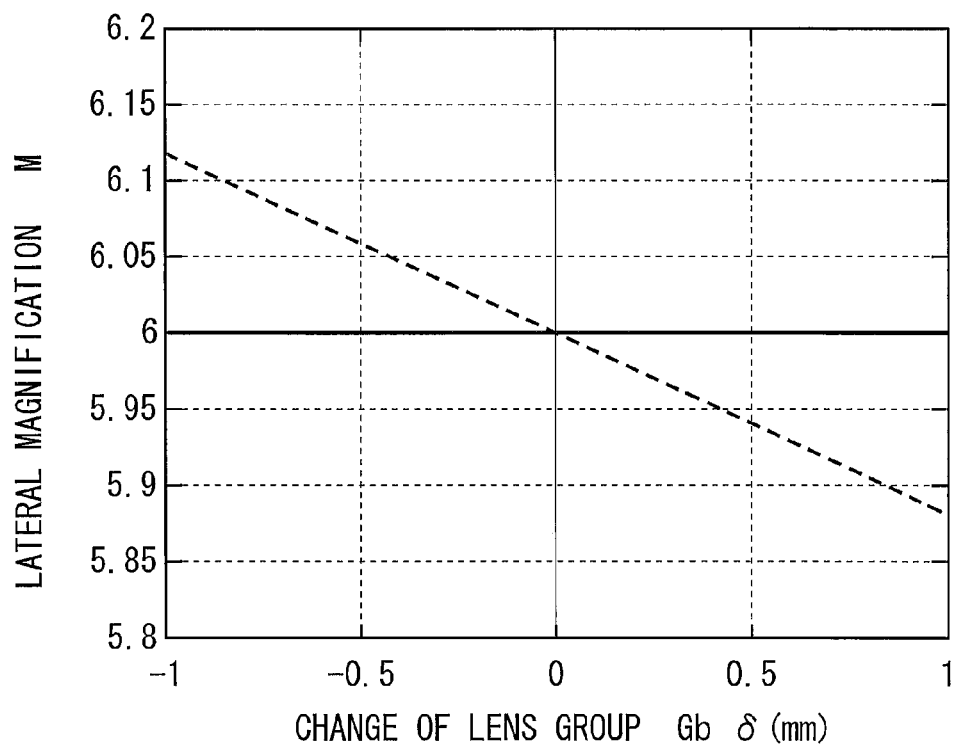
FIG. 23 is a graph plotting the lateral magnification against the displacement of the rear-group optical system in the focus adjustment unit in FIGS. 20 and 21.

Similarly to this case, if $\delta$ is changed from $-1$ mm to $+1$ mm, $\delta s=2$ mm, and the dependence of change in the working distance Zwd of the objective optical system 112 and the change in the lateral magnification M on the displacement $\delta$ (horizontal axis) of the rear-group optical system Gb, respectively, are as shown by the broken lines in FIGS. 22 and 23, respectively. When the respective focal lengths of the optical systems are set to be the same as those in Example 3, it is clear that the equation (9) is satisfied as in Example 3. The magnification M changes nonlinearly in Example 3, but the magnification M changes linearly in the present example.

In the equation (12), when D1=0 and $\Delta=0$, A is always zero. Therefore, the magnification M will not change when $\delta$ is changed to change the working distance. Further, the working distance changes linearly with change in $\Delta$.

Therefore, when the state shown in FIG. 20 is changed to that shown in FIG. 21, that is, D1 becomes 0 mm, the magnification M will not change at all, as indicated by the solid lines in FIGS. 22 and 23.

EXAMPLE 5

While the optical systems Ga and Gb have the same focal length in Examples 3 and 4 described above, alternatively the focal length of the front-group optical system Ga may differ from that of the rear-group optical system Gb.

In a microscope system of related art, both the imaging optical system 111 and the objective optical system 112 typically have a pupil diameter ranging from a few millimeters to a few tens of millimeters.

When |Fla| is made less than |Flb| in the focus adjustment unit 101, the diameter of the large pupil of the imaging optical system 111 can be made smaller at its side toward the objective optical system 112 by a factor of |Fla/Flb|. The outer diameter of the objective optical system 112 can thus be reduced, which makes the objective optical system 112 less invasive to a small animal and allows the objective optical system 112 to inserted into a living body and left there.

A microscope objective lens of related art and a small objective optical system 112 for small animals can thus be interchangeably used in a single system.

Figure 24:
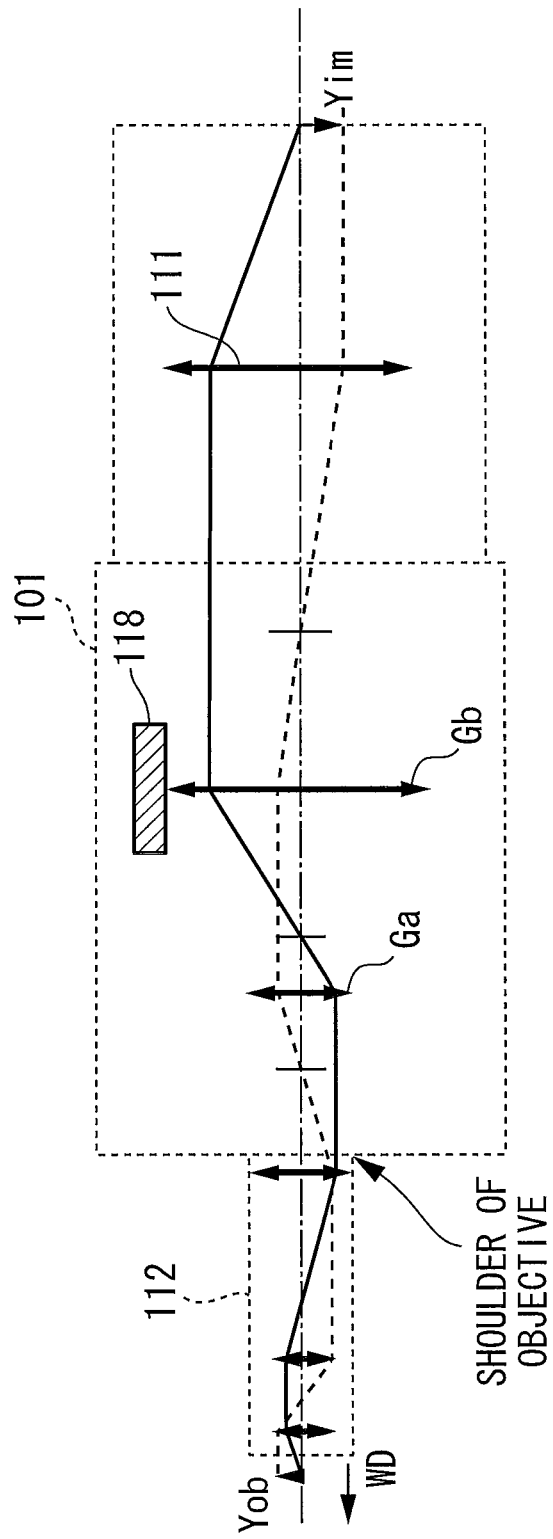
FIG. 24 shows a focus adjustment unit according to Example 5 used in the laser scanning microscope shown in FIG. 14.

FIG. 24 shows a case where each of the front-group optical system Ga and the rear-group optical system Gb is an optical system having a positive focal length, and the lens driver 118 moves the rear-group optical system Gb. $\delta$ changes from $-0.5$ mm to $+0.5$ mm, and hence $\delta s=1.0$ mm.

The focal length Fob of the objective optical system 112 is $-9$ mm. The focal length Fla of the front-group optical system Ga is 9 mm. The focal length Flb of the rear-group optical system Gb is 36 mm. The focal length Ftl of the imaging optical system 111 is 72 mm. D1=0 mm and D2=0 mm. The ratio of the pupil diameter of the objective optical system 112 to that of the imaging optical system 111 is ¼. To increase the tube length of the objective optical system 112, it is configured in such a way that an image is initially formed inside and then the light is substantially collimated by a positive-power lens. The objective optical system 112 thus has a negative focal length.

Figure 26:
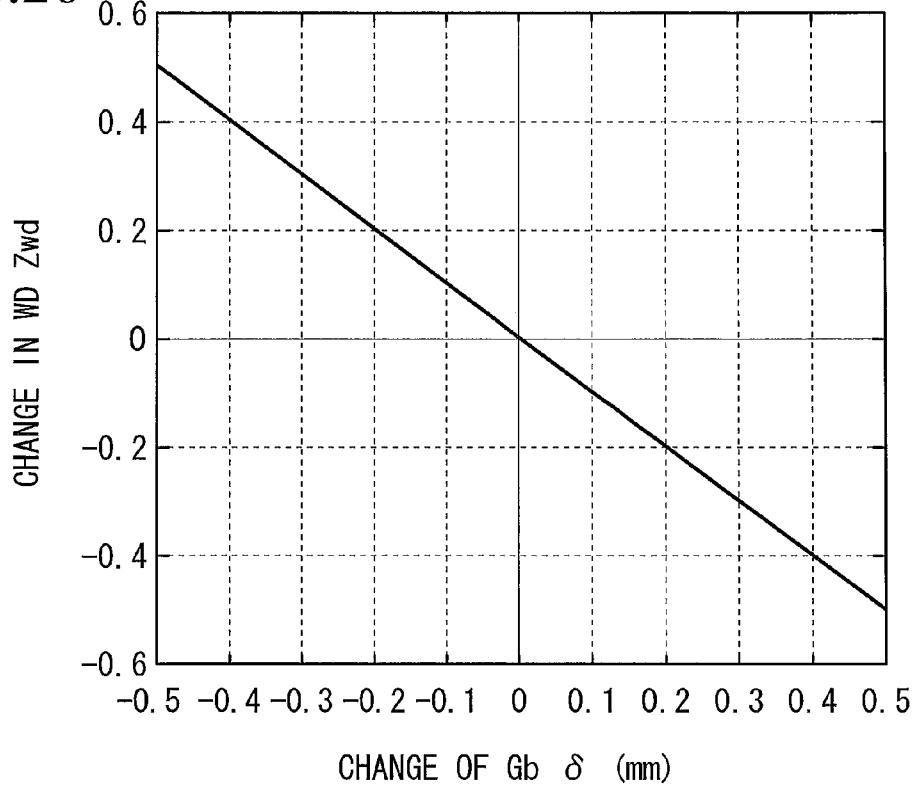
FIG. 26 is a graph plotting the amount of change in working distance of the objective lens against the displacement of a rear-group optical system in the focus adjustment unit in FIGS. 24 and 25.
Figure 27:
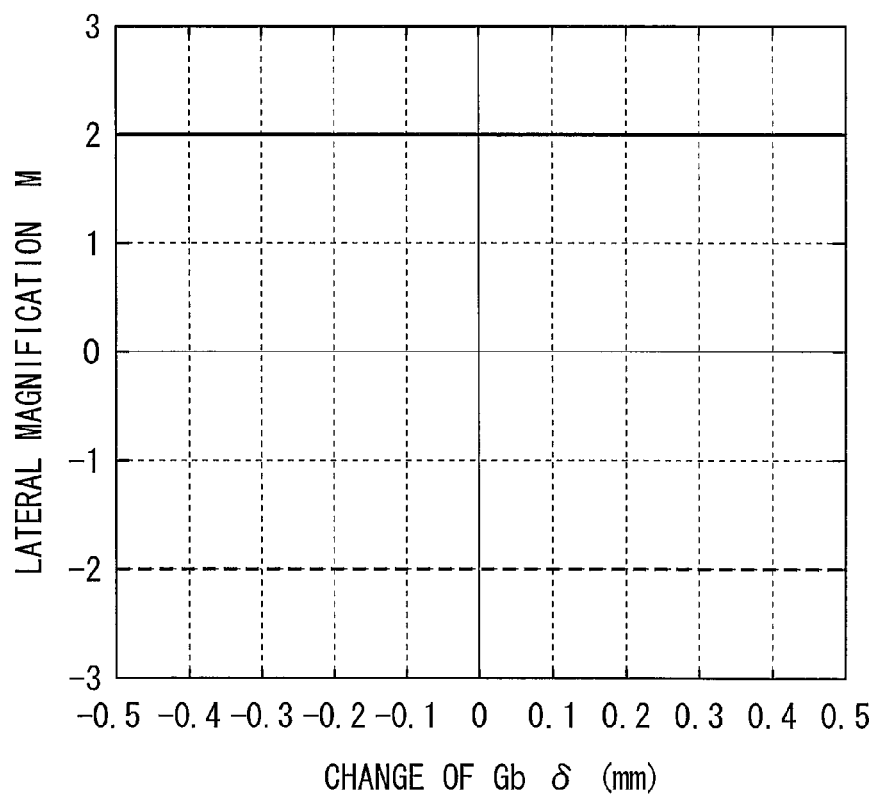
FIG. 27 is a graph plotting the lateral magnification against the displacement of the rear-group optical system in the focus adjustment unit in FIGS. 24 and 25.

Such a configuration has the advantage that even when the rear-group optical system Gb is displaced in the optical axis direction and the working distance of the objective optical system is changed, as shown in FIG. 26, there is a no change in magnification, as indicated by the broken line in FIG. 27.

Figure 25:
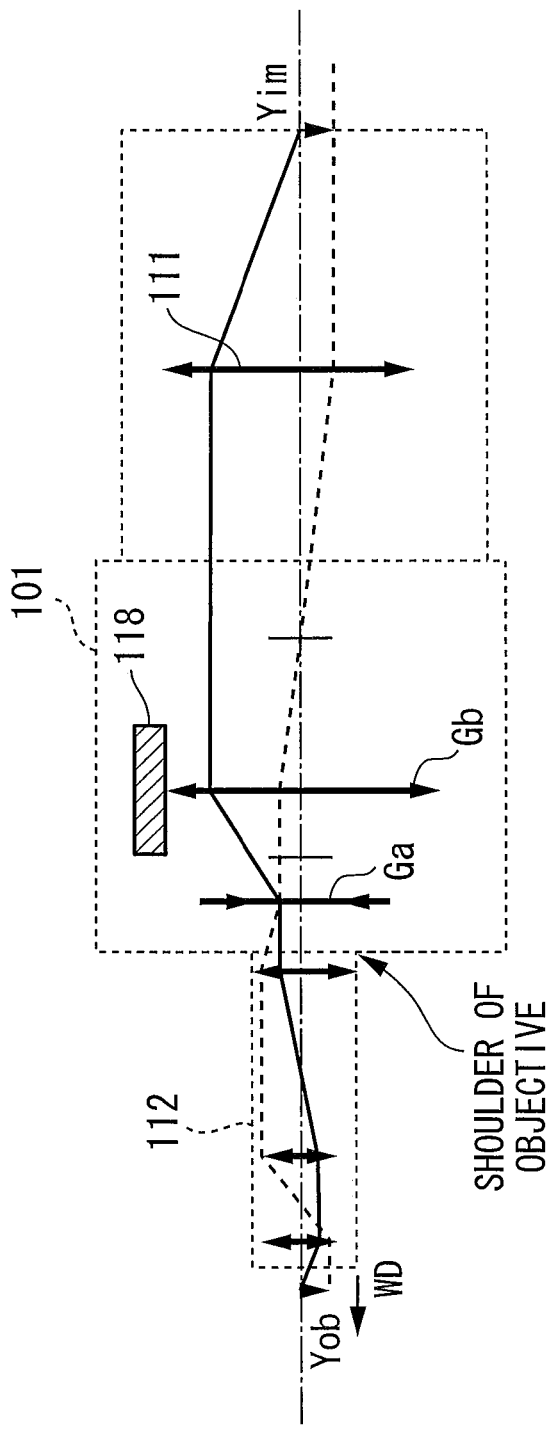
FIG. 25 shows a modification of the focus adjustment unit according to Example 5 used in the laser scanning microscope shown in FIG. 14.

FIG. 25 shows the case where the front-group optical system Ga has a negative focal length, the rear-group optical system Gb has a positive focal length, and the lens driver 118 moves the rear-group optical system Gb. $\delta$ changes from $-0.5$ mm to $+0.5$ mm, and hence $\delta s=1.0$ mm.

The focal length Fob of the objective optical system 112 is $-9$ mm. The focal length Fla of the front-group optical system Ga is $-9$ mm. The focal length Flb of the rear-group optical system Gb is 36 mm. The focal length Ftl of the imaging optical system 111 is 72 mm. D1=0 mm and D2=0 mm.

The objective optical system 112 has a negative focal length for the same reason as above. The ratio of the pupil diameter of the objective optical system 112 to that of the imaging optical system 111 is ¼.

The negative focal length of the front-group optical system Ga eliminates the need to form an image in the focus adjustment unit 101. The total length of the focus adjustment unit 101 can thus be smaller than that in the case shown in FIG. 24.

The negative focal length of the front-group optical system Ga, however, makes it difficult to locate the front focal point of the front-group optical system Ga in front of the abutting position of the objective optical system 112. To realize such a configuration, the back focal point of the objective optical system 112 is preferably located behind the abutting point of the objective optical system 112. The present example is configured accordingly.

Such a configuration has the advantage that even when the rear-group optical system Gb is displaced in the optical axis direction and the working distance of the objective optical system 112 is changed, as shown in FIG. 26, there is no change in the magnification M, as indicated by the solid line shown in FIG. 27.

EXAMPLE 6

In the present example, a plurality of objective optical systems 112 are used. It is supposed in the present example that, depending on an objective optical system 112 to be used, the position of the back focal point Dob of the objective optical system 112 relative to the abutting position (attachment position) of the objective optical system 112 varies.

In this case, a mechanism that moves the entire focus adjustment unit 101 is provided to adjust the position of the back focal point Dob of the objective optical system 112 so that the equation (9) is satisfied.

Figure 28:
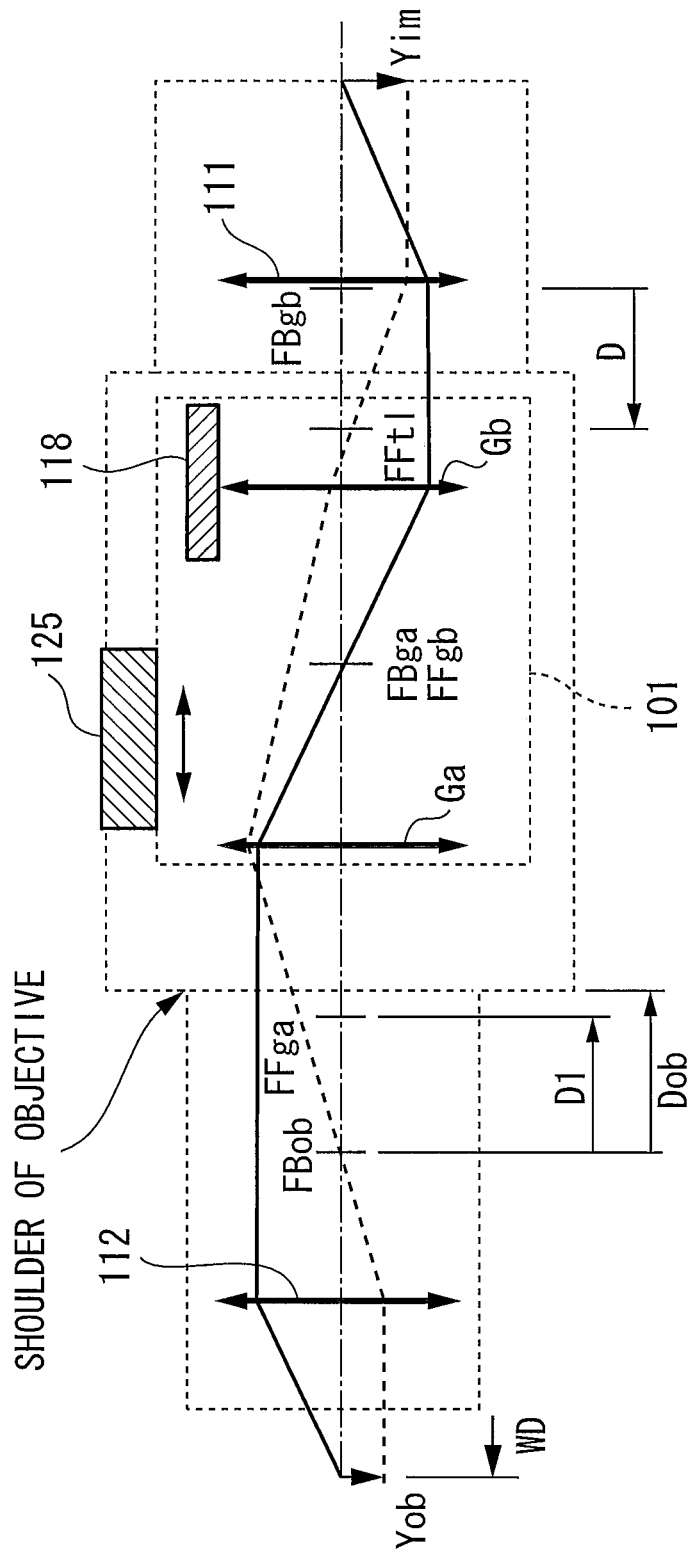
FIG. 28 shows a focus adjustment unit according to Example 6 used in the laser scanning microscope shown in FIG. 14.
Figure 29:
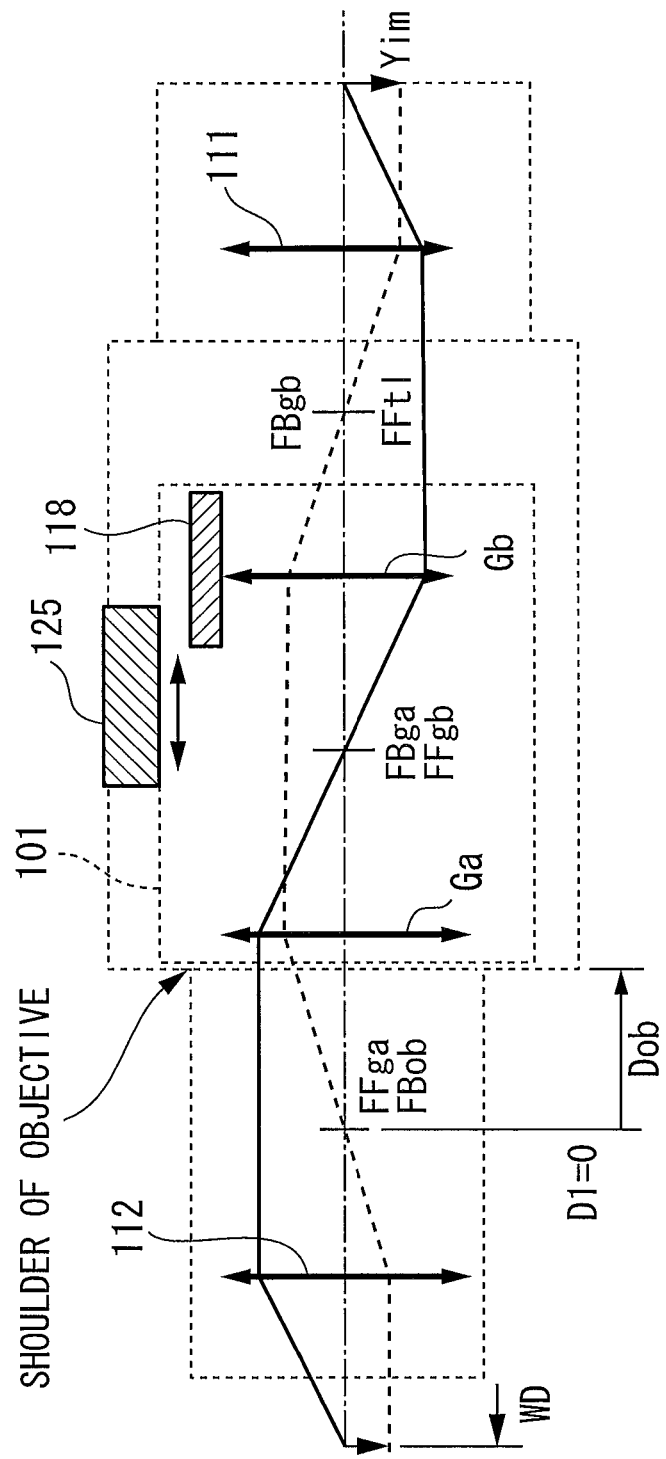
FIG. 29 shows a state where the front focal point of a front-group optical system in the focus adjustment unit shown in FIG. 28 coincides with the back focal point of an objective lens.

FIGS. 28 and 29 show a method for adjusting the position of the back focal point Dob of the objective optical system 112, wherein a moving mechanism 125 integrally moves the focus adjustment unit 101 including the lens driver 118 housed in the moving mechanism 125 in the optical axis direction when the abutting position of the objective optical system 112 and the imaging optical system 111 is determined in advance. Such a method is advantageous in that the parfocal position of the objective optical system 112 remains unchanged.

Figure 30:
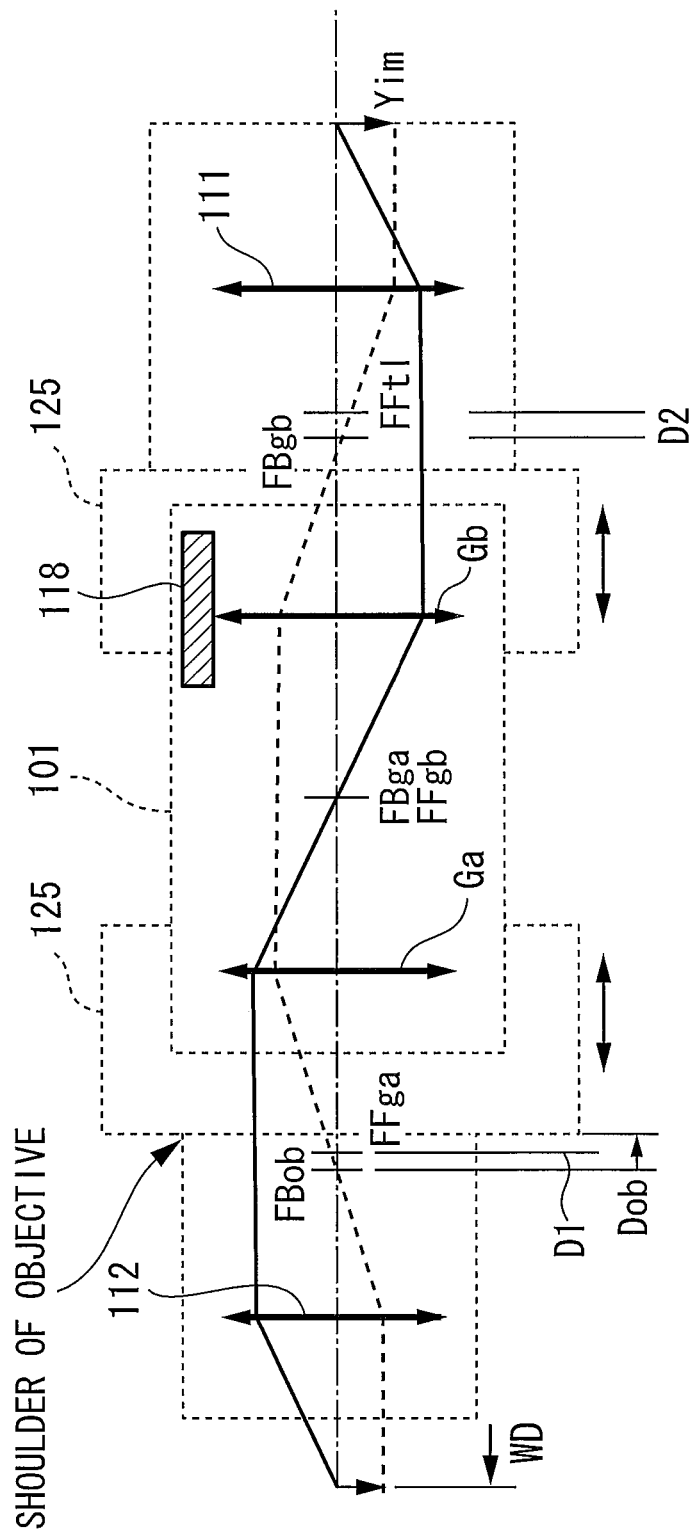
FIG. 30 shows a case where the position of the focus adjustment unit shown in FIG. 20 can be adjusted in the forward and backward directions.

FIG. 30 shows a case where the moving mechanism 125 can move the focus adjustment unit 101 forward (toward the objective optical system 112) or backward (toward the imaging optical system 111) for adjustment. Such a configuration is advantageous in that it not only allows the position of the back focal point Dob of the objective optical system 112 as well as D2 to be adjusted, but also allows the position of the exit pupil behind the imaging optical system 111 to be adjusted.

In the present example, the rear-group optical system Gb is driven to change the working distance of the objective optical system 112, but alternatively the front-group optical system Ga may be driven. In this case, the focus adjustment unit 101 and the lens driver 118 may make adjustment in such a way that the equation (8) is satisfied.

EXAMPLE 7

In a typical laser scan optical system, the exit pupil is located in the vicinity of a lateral scanner (in the case of the adjacent galvanometric mirrors 109, in the vicinity of the midpoint between the two mirrors).

However, when the focus adjustment unit 101 moves the rear-group optical system Gb (or the front-group optical system Ga) to change the working distance of the objective optical system 112, the position of the exit pupil of the pupil projection optical system 110 changes unfavorably. In general, since the objective optical system 112 determines the degree of vignetting, a slight shift of the pupil position will not cause a big problem.

However, when a pupil determined by portions other than the objective optical system 112 is substantially the same as or smaller than the pupil of the objective optical system 112, a change in working distance may worsen the degree of vignetting of light rays.

The above problem is solved by configuring the present example so that a pupil position adjuster 127 integrally moves a scan optical system 126 formed of the adjacent galvanometric mirrors 109, the dichroic mirror 108, the collimator optical system 107, the coupling optical system 104, and the tips of the optical fiber 105 and 114 in the optical axis direction of the pupil projection optical system 110 so as to adjust the pupil position, as shown in FIG. 31.

The position of the exit pupil of the objective optical system 112 when the position of the entrance pupil thereof is located at infinity can be made to coincide with a point in the vicinity of the galvanometric mirrors 109 by locating the scan optical system 126 in the position Zp expressed as follows:

$$Zp = -(Fpl/Ftl)_2 \times \{(D2-\delta)+(D1+\Delta)\times(Flb/Fla)^2/(1+A)\}$$

where $A=(D1+\Delta)(\Delta-\delta)/Fla^2$ and Fpl is the focal length of the pupil projection optical system 110. Here, the origin point of Zp is set as the back focal point of the pupil projection optical system 110.

When only the rear-group optical system Gb moves ($\Delta=0$), the scan optical system 126 is moved in the following manner:

$$\text{When } D1=0 \text{ and } D2=0, Zp=\delta\times(Fpl/Ftl)^2$$

That is, the scan optical system 126 may be moved by moving the rear-group optical system Gb by the same amount multiplied by $(Fpl/Ftl)^2$.

$$\text{When } D1=0, Zp=(\delta-D2)\times(Fpl/Ftl)^2$$

That is, it is sufficient to first shift the scan optical system 126 by $-D2\times(Fpl/Ftl)^2$, and then from that point as a reference, move it by the amount of movement of the rear-group optical system Gb multiplied by $(Fpl/Ftl)^2$.

When neither D1 nor D2 is zero, from equation (9) it follows that $(1+A)=1$ and hence the following equation is derived:

$$Zp = -(Fpl/Ftl)^2 \times \{(D2-\delta)+D1\times(Flb/Fla)^2\}$$
$$= \delta\times(Fpl/Ftl)^2 - D2\times(Fpl/Ftl)^2 - D1\times(Fpl/Ftl)^2 \times (Flb/Fla)^2$$

That is, it is sufficient to first shift the scan optical system 126 by $-D2\times(Fpl/Ftl)^2-D1\times(Fpl/Ftl)^2\times(Flb/Fla)^2$, and then from that point as a reference, move it by the amount of movement of the rear-group optical system Gb multiplied by $(Fpl/Ftl)^2$.

When only the front-group optical system Ga moves ($\delta=0$), the scan optical system 126 is moved in the following manner.

In this case, the following equation is derived from the equation (8) or (9):

$$(1+A)=1, Zp=-(Fpl/Ftl)^2\times\{(D2-\delta)+(D1+\delta)\times(Flb/Fla)^2\}$$

When D1=0 and D2=0, $Zp=-\Delta\times(Fpl/Ftl)^2\times(Flb/Fla)^2$, it is sufficient to move the scan optical system 126 by the amount of movement of the front-group optical system Ga multiplied by $-(Fpl/Ftl)^2_x(Flb/Fla)^2$.

When D1=0, $Zp=-(Fpl/Ftl)^2\times\{D2+\times(Flb/Fla)^2\}$. Thus it is sufficient to first shift the scan optical system 126 by $-D2\times(Fpl/Ftl)^2$, and then move it by the amount of movement of the front-group optical system Ga multiplied by $-(Fpl/Ftl)^2\times(Flb/Fla)^2$.

When neither D1 nor D2 is zero, $Zp=-(Fpl/Ftl)^2\times\{D2+(D1+\Delta)\times(Flb/Fla)^2\}$. Thus, it is sufficient to first shift the scan optical system 126 by $-D2\times Fpl/Ftl)^2-D1\times(Fpl/Ftl)^2$, and then move it by the amount of movement of the front-group optical system Ga multiplied by $-(Fpl/Ftl)^2(Flb/Fla)^2$.

What is claimed is:

1. A focus adjustment unit used in a microscope system including an objective optical system that converts light from a specimen into a substantially collimated light beam and an imaging optical system that forms an image from the substantially collimated light beam of the objective optical system at a predetermined position, the focus adjustment unit being disposed between the objective optical system and the imaging optical system and configured to change the working distance of the objective optical system, in which a front side is defined as the side where the objective optical system is located and a back side is defined as the side where the imaging optical system is located, the focus adjustment unit comprising:

a front-group optical system and a rear-group optical system that are sequentially disposed from the front side, each of the front-group and rear-group optical systems having refractive power; and a lens driver that drives the front-group optical system, the rear-group optical system, or both, along the optical axis direction to change the relative distance between the front-group and rear-group optical systems along the optical axis direction, wherein the front-group optical system is disposed such that its front focal point is positioned sufficiently proximate to the back focal point of the objective optical system to maintain a small gap distance between the back focal point and the front focal point, and a tip of the objective optical system is in physical contact with the specimen to minimize movement during observation of the specimen.

2. The focus adjustment unit according to claim 1, wherein the front-group optical system and the rear-group optical system are moved so that the midpoint between them is in the range where the front-group optical system and the rear-group optical system form an afocal optical system.

3. The focus adjustment unit according to claim 2, wherein $|Fla|>|Flb|$, where Flb represents the focal length of the rear-group optical system.

4. The focus adjustment unit according to claim 3, wherein the front-group optical system has a negative focal length.

5. The focus adjustment unit according to claim 4, wherein the back focal point of the objective optical system is located behind the abutting position of the objective optical system with the imaging optical system.

6. The focus adjustment unit according to claim 1,
wherein only the front-group optical system is moved in the optical axis direction,
the rear-group optical system is fixed, and
the following equation (8) is satisfied:

$$|D1a \times \Delta s|/(Fla)^2 \leq 0.05 \qquad (8)$$

where $\Delta s$ represents the total distance over which the front-group optical system moves, $D1a$ represents the gap between the back focal point of the objective optical system and the front focal point of the front-group optical system when the front-group optical system moves to the middle position of its movement range, and Fla represents the focal length of the front-group optical system.

7. The focus adjustment unit according to claim 6, wherein $D1a=0$.

8. The focus adjustment unit according to claim 6, wherein $|Fla|>|Flb|$.

9. The focus adjustment unit according to claim 8, wherein the front-group optical system has a negative focal length.

10. The focus adjustment unit according to claim 9, wherein the back focal point of the objective optical system is located behind the abutting position of the objective optical system with the imaging optical system.

11. The focus adjustment unit according to claim 1, wherein
the front-group optical system is fixed, and
only the rear-group optical system is moved along the optical axis direction in accordance with the following equation:

$$D1 \times \delta s|/(Fla)^2 \leq 0.05$$

where $\delta s$ represents the total distance over which the rear-group optical system moves, D1 represents the gap distance between the back focal point of the objective optical system and the front focal point of the front-group optical system, and Fla represents the focal length of the front-group optical system.

12. The focus adjustment unit according to claim 11, wherein the front focal point of the front-group optical system coincides with the back focal point of the objective optical system.

13. The focus adjustment unit according to claim 11, wherein $|Fla|>|Flb|$ where Flb represents the focal length of the rear-group optical system.

14. The focus adjustment unit according to claim 1, further comprising an adjustment mechanism that adjusts the gap between the back focal point of the objective optical system and the front focal point of the front-group optical system.

15. The focus adjustment unit according to claim 1, wherein the back focal point of the rear-group optical system is located in the vicinity of the front focal point of the imaging optical system.

16. The focus adjustment unit according to claim 1, further comprising an adjustment mechanism that adjusts the gap between the back focal point of the rear-group optical system and the front focal point of the imaging optical system.

17. A focus adjustment unit used in a microscope system including an objective optical system that converts light from a specimen into a substantially collimated light beam and an imaging optical system that forms an image from the substantially collimated light beam of the objective optical system at a predetermined position, the focus adjustment unit being disposed between the objective optical system and the imaging optical system and configured to change the working distance of the objective optical system, in which a front side is defined as the side where the objective optical system is located and a back side is defined as the side where the imaging optical system is located, the focus adjustment unit comprising:

a front-group optical system and a rear-group optical system that are sequentially disposed from the front side, each of the front-group and rear-group optical systems having refractive power; and a lens driver that drives the front-group optical system, or the rear-group optical system, or both, along the optical axis direction to change the relative distance between the front-group and rear-group optical systems along the optical axis direction, wherein the front-group optical system is disposed such that its front focal point is positioned sufficiently proximate to the back focal point of the objective optical system to maintain a small gap distance between the back focal point and the front focal point, wherein the front-group optical system is fixed, and only the rear-group optical system is moved along the optical axis direction in accordance with the following equation:

$|D1 \times \delta s|/(Fla)^2 \leq 0.05$, where $\delta s$ represents the total distance over which the rear-group optical system moves, D1 represents the gap distance between the back focal point of the objective optical system and the front focal point of the front-group optical system, and Fla represents the focal length of the front-group optical system, and |Fla|>|Flb|, where Flb represents the focal length of the rear-group optical system, and the front-group optical system has a negative focal length.

18. The focus adjustment unit according to claim 17, wherein the back focal point of the objective optical system is located behind the abutting position of the objective optical system with the imaging optical system.

19. An optical scanning microscope comprising:
   an objective optical system that focuses light from a specimen;
   an imaging optical system that forms an image from the light focused by the objective optical system at a predetermined position;
   a focus adjustment unit including:
      a front-group optical system and a rear-group optical system that are sequentially disposed from a front side, the front side defined as the side where the objective optical system is located and a back side is defined as the side where the imaging optical system is located, each of the front-group and rear-group optical systems having refractive power; and
      a lens driver that drives the front-group optical system, or the rear-group optical system, or both, along the optical axis direction to change the relative distance between the front-group and rear-group optical systems along the optical axis direction,
      wherein the front-group optical system is disposed such that its front focal point is positioned sufficiently proximate to the back focal point of the objective optical system to maintain a small gap distance between the back focal point and the front focal point,
   a pupil projection optical system disposed behind the imaging lens, the pupil projection optical system converting the image of the specimen formed by the imaging lens at the predetermined position into a collimated light beam;
   a scanning optical system including a lateral scanner that laterally scans the light substantially collimated by the pupil projection optical system, a light emitter that emits light that illuminates or excites the specimen, a light receiver that receives the light from the specimen, a first collimator optical system that substantially collimates the light from the light emitter, a second collimator optical system that focuses the light from the specimen on the light receiver, and a detected light separator that separates the light from the specimen from the light from the light emitter; and
   a pupil position adjuster that moves the scan optical system in the optical axis direction of the pupil projection optical system so that the pupil position coincides with a point that is sufficiently proximate to the lateral scanner.

* * * * *